(12) United States Patent  
Masuda et al.

(10) Patent No.: US 10,754,070 B2  
(45) Date of Patent: Aug. 25, 2020

(54) MICROLENS ARRAY ASSEMBLING PROCESS

(71) Applicant: INTERNATIONAL BUSINESS MACHINES CORPORATION, Armonk, NY (US)

(72) Inventors: Koji Masuda, Kawasaki (JP); Alexander Janta-Polczynski, Shefford (CA); Patrick Jacques, St. Hubert (CA); Vincent Langlois, Granby (CA); Paul Francis Fortier, Richelieu (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/210,630

(22) Filed: Dec. 5, 2018

(65) Prior Publication Data

US 2020/0183059 A1 Jun. 11, 2020

(51) Int. Cl.
*G02B 6/42* (2006.01)
*G02B 6/38* (2006.01)
(Continued)

(52) U.S. Cl.
CPC .......... *G02B 3/0075* (2013.01); *G02B 6/125* (2013.01); *G02B 6/3885* (2013.01);
(Continued)

(58) Field of Classification Search
CPC .................................................. G02B 3/0075
See application file for complete search history.

(56) References Cited

U.S. PATENT DOCUMENTS 3,620,260 A 11/1971 Bourlet
4,021,637 A 5/1977 DeHaeck
(Continued)

FOREIGN PATENT DOCUMENTS

EP 2581776 A1 4/2013

OTHER PUBLICATIONS

Barwicz, "Enabling Large-Scale Deployment of Photonics Through Cost-Efficient and Scalable Packaging", 2015 IEEE International Conference on Group IV Photonics, Oct. 2015, pp. 155-156.
(Continued)

*Primary Examiner* — Rhonda S Peace
(74) *Attorney, Agent, or Firm* — Tutunjian & Bitetto, P.C.; Vazken Alexanian

(57) ABSTRACT

An optical device includes: a substrate including plural waveguide cores; and an optical component provided on the substrate, the optical component including plural lenses, each of the plural lenses transmitting light passing through one of the corresponding plural waveguide cores on the substrate. The substrate and the optical component are each provided with a positioning structure. The positioning structure includes plural protrusions and plural recesses provided on the substrate and the optical component. Each of the plural recesses accommodates a corresponding one of the plural protrusions, and an outer surface of each of the plural protrusions contacts a positioning surface of a corresponding one of the plural recesses. The positioning surface is a part of an inner surface of each of the plural recesses having accommodated the corresponding one of the plural protrusions to position the plural lenses relative to the substrate.

10 Claims, 15 Drawing Sheets

(51) Int. Cl.
*G02B 3/00* (2006.01)
*G02B 6/125* (2006.01)

(52) U.S. Cl.
CPC ........... *G02B 6/4204* (2013.01); *G02B 6/425* (2013.01); *G02B 6/4226* (2013.01)

(56) References Cited

U.S. PATENT DOCUMENTS

| | | | |
|---|---|---|---|
| 4,328,405 A | 5/1982 | Cuneo | |
| 5,732,656 A | 3/1998 | Tran | |
| 5,819,650 A | 10/1998 | Shih | |
| 6,085,967 A * | 7/2000 | Grande | H01L 21/68 228/123.1 |
| 6,652,159 B2 | 11/2003 | Chan et al. | |
| 6,708,839 B2 | 3/2004 | Diesterbeck | |
| 6,731,853 B2 | 5/2004 | Boudreau et al. | |
| 6,910,812 B2 * | 6/2005 | Pommer | G02B 6/4201 257/200 |
| 6,934,429 B2 | 8/2005 | Kikuchi et al. | |
| 7,086,134 B2 | 8/2006 | Dautartas et al. | |
| 7,221,829 B2 | 5/2007 | Oono et al. | |
| 7,271,461 B2 | 9/2007 | Dutta | |
| 7,290,321 B2 | 11/2007 | Steinberg et al. | |
| 7,340,279 B2 | 3/2008 | Chen et al. | |
| 7,449,674 B2 | 11/2008 | Ueno et al. | |
| 7,505,650 B1 | 3/2009 | Grzybowski et al. | |
| 7,553,088 B2 | 6/2009 | Nakajima | |
| 7,642,645 B2 * | 1/2010 | Daniel | B23Q 3/18 257/680 |
| 7,851,811 B2 | 12/2010 | Dutta | |
| 7,851,816 B2 | 12/2010 | Dutta | |
| 7,894,691 B2 | 2/2011 | Ikeda et al. | |
| 7,922,514 B2 * | 4/2011 | Liao | H01R 13/629 439/378 |
| 7,923,273 B2 | 4/2011 | Dutta | |
| 8,111,730 B2 | 2/2012 | Budd et al. | |
| 8,290,008 B2 | 10/2012 | Andry et al. | |
| 8,319,230 B1 | 11/2012 | Dutta | |
| 8,411,719 B2 | 4/2013 | Budd et al. | |
| 8,483,253 B2 | 7/2013 | Budd et al. | |
| 8,559,474 B2 | 10/2013 | Andry et al. | |
| 8,585,300 B2 * | 11/2013 | Buijs | G02B 6/00 385/78 |
| 8,766,284 B1 | 7/2014 | Dutta | |
| 8,971,678 B2 | 3/2015 | Nakano et al. | |
| 9,229,169 B2 | 1/2016 | Doany et al. | |
| 9,246,592 B2 | 1/2016 | Budd et al. | |
| 9,341,773 B2 | 5/2016 | Dutta | |
| 9,341,797 B2 | 5/2016 | Nakagawa et al. | |
| 9,354,408 B2 | 5/2016 | Noma et al. | |
| 9,360,644 B2 | 6/2016 | Fasano et al. | |
| 9,372,305 B2 | 6/2016 | Numata et al. | |
| 9,429,711 B2 | 8/2016 | Nakagawa et al. | |
| 9,470,855 B1 | 10/2016 | Shubin et al. | |
| 9,470,858 B2 | 10/2016 | Houbertz-Krauss et al. | |
| 9,500,809 B2 * | 11/2016 | Popp | G02B 6/322 |
| 9,519,105 B1 | 12/2016 | Shubin et al. | |
| 9,551,848 B1 | 1/2017 | Dutta | |
| 9,568,679 B2 | 2/2017 | Doany et al. | |
| 9,632,265 B2 | 4/2017 | Nekado et al. | |
| 9,656,420 B2 | 5/2017 | Barwicz et al. | |
| 9,658,411 B2 | 5/2017 | Numata et al. | |
| 9,658,415 B2 | 5/2017 | Budd et al. | |
| 9,662,830 B2 | 5/2017 | Barwicz et al. | |
| 9,671,578 B2 | 6/2017 | Budd et al. | |
| 9,720,174 B2 | 8/2017 | Houbertz et al. | |
| 9,720,190 B2 | 8/2017 | Nakagawa et al. | |
| 9,721,812 B2 | 8/2017 | Horibe et al. | |
| 9,726,824 B1 | 8/2017 | Berger et al. | |
| 9,726,826 B2 | 8/2017 | Ooi et al. | |
| 9,772,462 B2 | 9/2017 | Noma et al. | |
| 9,817,192 B2 | 11/2017 | Nekado et al. | |
| 9,829,204 B2 | 11/2017 | Oohigashi et al. | |
| 9,835,797 B1 | 12/2017 | Dutta | |
| 9,952,392 B2 | 4/2018 | Nakagawa et al. | |
| 9,958,625 B2 | 5/2018 | Budd et al. | |
| 9,977,191 B2 | 5/2018 | Nakagawa et al. | |
| 9,989,713 B1 | 6/2018 | Cyr et al. | |
| 10,025,044 B1 * | 7/2018 | Masuda | G02B 6/4245 |
| 10,048,439 B1 | 8/2018 | Dutta | |
| 10,175,432 B2 | 1/2019 | Tateyama | |
| 10,191,218 B2 * | 1/2019 | Wada | G02B 6/262 |
| 10,254,476 B1 | 4/2019 | Dutta | |
| 10,365,431 B2 | 7/2019 | Heroux et al. | |
| 10,371,907 B2 | 8/2019 | Cyr et al. | |
| 10,539,752 B2 * | 1/2020 | Masuda | G02B 6/4239 |
| 2002/0084565 A1 * | 7/2002 | Dautartas | G02B 6/4204 269/289 R |
| 2002/0131752 A1 * | 9/2002 | Boudreau | G02B 6/3636 385/137 |
| 2003/0201462 A1 * | 10/2003 | Pommer | G02B 6/4201 257/200 |
| 2004/0052494 A1 * | 3/2004 | Kobayashi | G02B 6/3656 385/137 |
| 2004/0184737 A1 * | 9/2004 | Oono | G02B 6/4201 385/52 |
| 2005/0151272 A1 | 7/2005 | Street et al. | |
| 2006/0068629 A1 * | 3/2006 | Nakajima | G02B 6/32 439/378 |
| 2007/0267569 A1 * | 11/2007 | Ueno | G02B 6/423 250/216 |
| 2013/0084039 A1 * | 4/2013 | Doany | G02B 6/32 385/33 |
| 2014/0254985 A1 | 9/2014 | Lai | |
| 2015/0139589 A1 | 5/2015 | Sakai et al. | |
| 2016/0116695 A1 * | 4/2016 | Nekado | G02B 6/421 385/14 |
| 2016/0209596 A1 | 7/2016 | Ooi et al. | |
| 2017/0146741 A1 | 5/2017 | Horibe et al. | |
| 2017/0148646 A1 | 5/2017 | Horibe et al. | |
| 2017/0322382 A1 * | 11/2017 | Tateyama | G02B 6/264 |
| 2018/0259729 A1 | 9/2018 | Cyr et al. | |
| 2018/0335571 A1 * | 11/2018 | Wada | G02B 6/262 |
| 2018/0335579 A1 * | 11/2018 | Wada | G02B 6/32 |

OTHER PUBLICATIONS

Tokunari, "Assembly and Demonstration of High Bandwidth-Density Optical MCM", 2015 IEEE 65th Electronic Components and Technology Conference, May 2015, pp. 799-803.

Tokunari, "High-Bandwidth Density and Low-Power Optical MCM Using Waveguide-Integrated Organic Substrate", Journal of Light Wave Technology, vol. 32, No. 6, Mar. 2014, pp. 1207-1212.

Masuda, K. et al., "High Density Micro-lens Array Connector for Optical Multi-chip Module" 2016 IEEE 66th Electronic Components and Technology Conference (May 2016) pp. 2317-2322.

Offrein, B.J. et al., "High bandwidth board-level parallel optical interconnects for server applications" ECOC (Sep. 2006) pp. 1-37.

U.S. Notice of Allowance issued in U.S. Appl. No. 16/273,395 dated Feb. 21, 2020, pp. 1-31.

International Search Report issued in related case: IB2020/050697 dated Apr. 22, 2020, 2020, pp. 1-9.

* cited by examiner

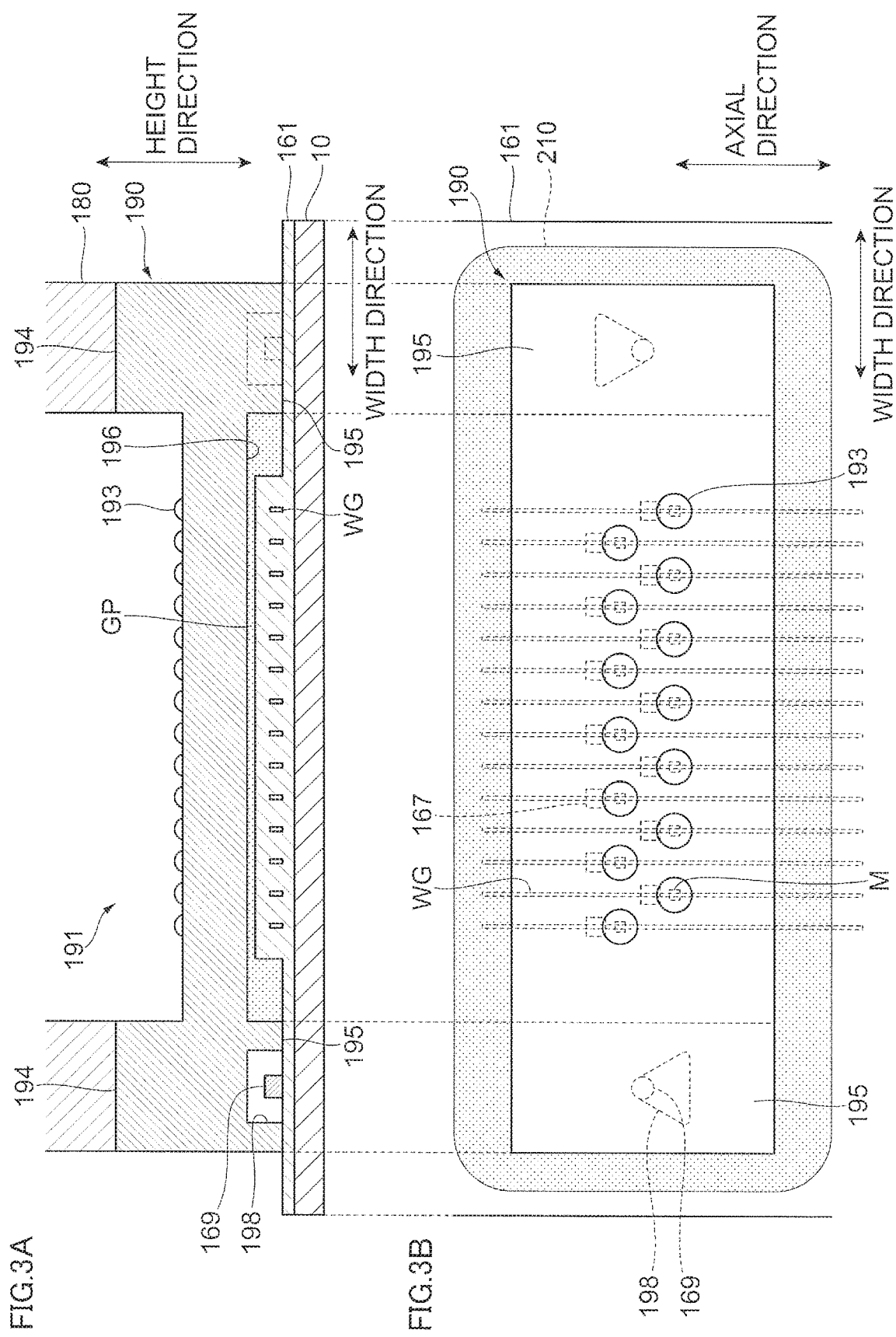

MICROLENS ARRAY ASSEMBLING PROCESS

BACKGROUND

TECHNICAL FIELD

The present invention relates to a microlens array assembling process, and more particularly to an alignment process for attaching an optical component having a microlens array with a substrate.

SUMMARY

According to an embodiment of the present invention, there is provided an optical device. The optical device includes a substrate and an optical component. The substrate includes plural waveguide cores, the plural waveguide cores allowing light to pass through the plural wave guide cores. The optical component is provided on the substrate and includes plural lenses, each of the plural lenses transmitting light passing through one of the corresponding plural waveguide cores on the substrate. The substrate and the optical component are each provided with a positioning structure to position the plural lenses relative to the substrate. The positioning structure includes plural protrusions provided on at least one of the substrate and the optical component, and plural recesses provided on at least the other of the substrate and the optical component, each of the plural recesses accommodating a corresponding one of the plural protrusions. An outer surface of each of the plural protrusions contacts a positioning surface of a corresponding one of the plural recesses, the positioning surface being a part of an inner surface of each of the plural recesses having accommodated the corresponding one of the plural protrusions to position the plural lenses relative to the substrate.

According to another embodiment of the present invention, there is provided an optical device including a first body and a second body. The first body includes an output portion outputting light. The second body includes a receive portion receiving light from the output portion. The first body and the second body are each provided with a positioning structure by which a relative position of the output portion and the receive portion is defined. The positioning structure includes plural protrusions provided on at least one of the first body and the second body, and plural recesses provided on at least the other one of the first body and the second body, each of the plural recesses accommodating a corresponding one of the plural protrusions. A position of the first body relative to the second body is changed in a state where each of the plural recesses accommodates the corresponding one of the plural protrusions, and the relative position of the output portion and the receive portion is defined at a position where each of the plural recesses restricts movement of the corresponding one of the plural protrusions.

According to still another embodiment of the present invention, there is provided a method for fabricating an optical device. The method includes forming a substrate and an optical component, the substrate including plural waveguide cores, the plural waveguide cores allowing light to pass through the plural waveguide cores, the optical component being provided on the substrate, the optical component including plural lenses, each of the plural lenses transmitting light passing through one of the corresponding plural waveguide cores on the substrate, the substrate and the optical component being each provided with a positioning structure to position the plural lenses relative to the substrate, the positioning structure including plural protrusions provided on at least one of the substrate and the optical component, and plural recesses provided on at least the other one of the substrate and the optical component. The method further includes inserting the plural protrusions in corresponding one of the plural recesses. The method further includes changing a position of the optical component relative to the substrate until an outer surface of each of the plural protrusions contacts a positioning surface of a corresponding one of the plural recesses, the positioning surface being a part of an inner surface of each of the plural recesses having accommodated the corresponding one of the plural protrusions to position the plural lenses relative to the substrate.

These and other features and advantages will become apparent from the following detailed description of illustrative embodiments thereof, which is to be read in connection with the accompanying drawings.

BRIEF DESCRIPTION OF THE DRAWINGS

FIG. 3A is a schematic cross-sectional view taken along the line IIIA-IIIA in FIG. 2.

FIG. 3B is a top view of a substrate side component and a waveguide layer according to the first embodiment.

DETAILED DESCRIPTION

Hereinafter, exemplary embodiments of the present invention will be described in detail with reference to the attached drawings.

It is to be noted that the present invention is not limited to the exemplary embodiments given below and can be implemented with various modifications within the scope of the present invention. In addition, the drawings used herein are for purposes of illustration, and may not show actual dimensions.

(First Embodiment)
(Communication System 1)

Figure 1:
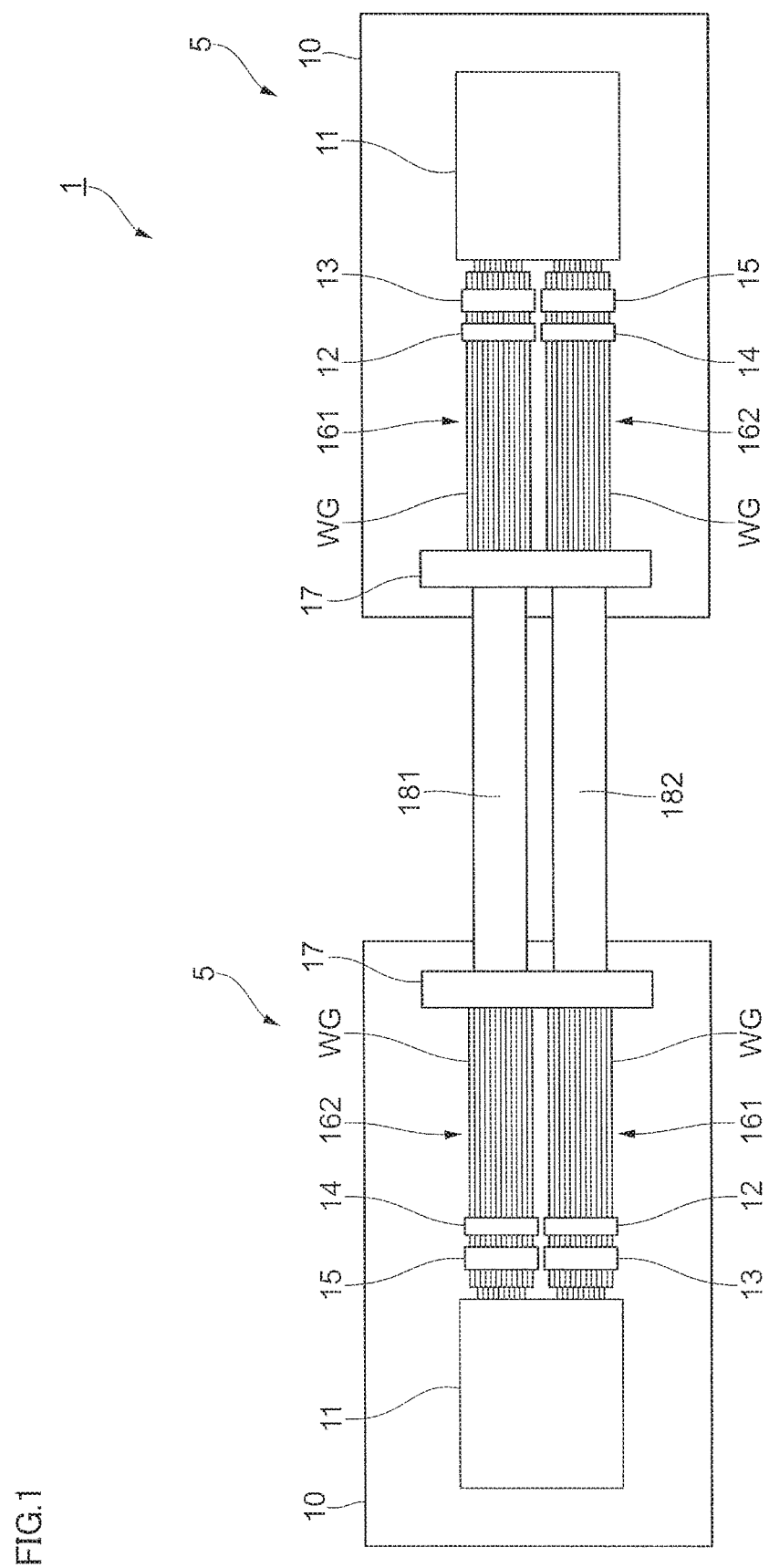
FIG. 1 is a top view of an optical communication system according to the first embodiment.

FIG. 1 is a top view of an optical communication system 1 according to the first embodiment. As shown in the figure, the optical communication system 1 can include two multi-chip modules (MCMs) 5. A multi-chip module (MCM) 5 can include a main substrate 10, a central processing unit (CPU) 11, a vertical cavity surface emitting laser (VCSEL) chip array 12, a laser diode driver (LDD) chip 13, a photodiode (PD) chip array 14, a trans-impedance amplifiers (TIA) chip 15, waveguide layers 161 and 162, and a fiber connector 17. Further, as shown in the figure, the optical communication system 1 can include fiber cables 181 and 182 each having several (e.g., 12 or 24) fiber cable cores.

The waveguide layer 161 can include multiple waveguide cores WG whose number matches the number of cores of the fiber cable 181 or 182. The VCSEL chip array 12 can include multiple VCSEL devices whose number matches the number of fiber cores (not shown) of the waveguide layer 161. The waveguide layer 162 can include multiple waveguide cores WG whose number matches the number of fiber cores (not shown) of the fiber cable 181 or 182. The PD chip array 14 can include multiple PD devices whose number matches the number of cores of the waveguide layer 162.

Figure 2:
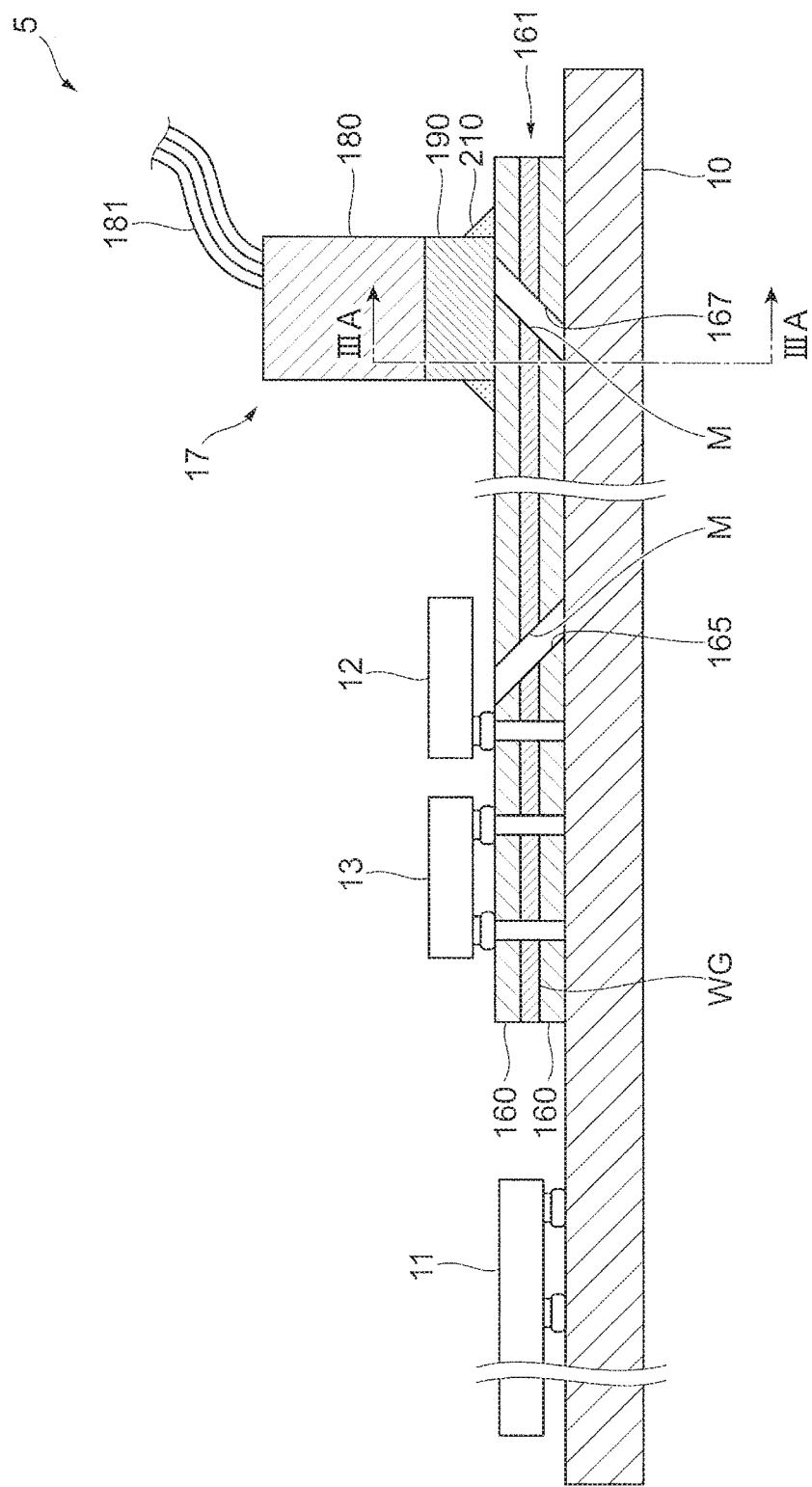
FIG. 2 is a side view of a multi-chip module (MCM) according to the first embodiment.

FIG. 2 is a side view of the MCM 5 according to the first embodiment. As shown in the figure, the waveguide layer 161 can be formed on the surface of the main substrate 10. The waveguide layer 161 can include the waveguide cores WG, a cladding layer 160 above the waveguide cores WG, and another cladding layer 160 below the waveguide cores WG. The waveguide layer 161 can be formed as a polymer waveguide.

The waveguide layer 161 can be provided with multiple mirror cavities 165. The mirror cavities 165 are provided at one end of the waveguide cores WG (left side in FIG. 2) and face the VCSEL chip array 12. Each mirror cavity 165 is provided on each waveguide core WG. In other words, the number of the mirror cavities 165 matches the number of the waveguide cores WG.

The waveguide layer 161 can also be provided with multiple mirror cavities (mirror ablation holes) 167. The mirror cavities 167 are provided at the other end of the waveguide cores WG (right side in FIG. 2) and face the fiber connector 17. Each mirror cavity 167 is provided on each waveguide core WG. In other words, the number of the mirror cavities 167 matches the number of the waveguide cores WG.

The mirror cavities 165 and 167 can be inclined at an angle of 45° to form reflective surfaces (mirrors M) on boundaries (interfaces) between the waveguide cores WG and the mirror cavities 165 or the mirror cavities 167. In the present embodiment, the boundaries can be provided without a metal coating, and the mirror cavities 165 and 167 can be filled with air (atmosphere). This configuration enables the mirrors M to reflect the light by total internal reflection (TIR). More specifically, the mirrors M of the mirror cavities 165 reflect the light from the VCSEL chip array 12 to the waveguide cores WG by total internal reflection. The mirrors M of the mirror cavities 167 reflect the light from the waveguide cores WG to the fiber connector 17 by total internal reflection.

Note that in the present embodiment, the mirrors M of the mirror cavities 167 are provided in staggered positions in the waveguide cores WG to form two rows (refer to FIG. 3B.)

The fiber connector 17 can include a fiber side component 180 and a substrate side component 190. The fiber side component 180 connected to the fiber cables 181 and 182 can be mounted on the substrate side component 190. The substrate side component 190 can be directly mounted on the waveguide layer 161 to receive the fiber side component 180.

The substrate side component 190 is glued onto the waveguide layer 161 using an underfilling material, e.g., an adhesive 210. The adhesive 210 can be a photocurable material, such as ultraviolet (UV) curing resin or a thermal curing material.

Next, an explanation is given of a general method for fixing the fiber connector 17 to the waveguide layer 161 in the first embodiment with reference to FIG. 2. Note that the mirror cavities 165 and 167 are assumed to have been provided on the surface of the waveguide layer 161 with conventional techniques, such as laser processing or dicing.

The substrate side component 190 of the fiber connector 17 is first mounted on the waveguide layer 161 (details will be described below). The adhesive 210 in a fluidized state is applied around the substrate side component 190. The adhesive 210 distributes through a gap GP (refer to FIG. 3A) between the bottom surface of the substrate side component 190 and the top surface of the waveguide layer 161 due to capillary effect.

Curing light is then directed towards the gap GP from above to cure the adhesive 210. This enables to fix the substrate side component 190 to the waveguide layer 161. The fiber side component 180 to which the fiber cables 181 and 182 have been connected is mounted on the substrate side component 190.

FIG. 3A is a schematic cross-sectional view taken along the line IIIA-IIIA in FIG. 2. FIG. 3B is a top view of the substrate side component 190 and the waveguide layer 161 according to the first embodiment.

As shown in FIGS. 3A and 3B, the substrate side component 190 can have a generally cuboid shape. The substrate side component 190 can include a substrate side microlens array 191, first support portions 194, and second support portions 195. In the present embodiment, the substrate side component 190 can be configured as a single piece.

The microlens array 191 can be provided on the top surface of the substrate side component 190. The microlens array 191 can include multiple microlenses 193. The microlens array 191 is configured in two rows corresponding to the rows of the mirrors M of the mirror cavities 167.

The substrate side component 190 can be positioned on the waveguide layer 161 so that each microlens 193 is aligned with the corresponding mirror M provided on each waveguide core WG. Note that the fiber side component 180 can also include a fiber side microlens array (not shown). Each microlens 193 of the substrate side component 190 is aligned with each fiber side microlens. This configuration allows the light reflected at the mirror M to pass the microlens 193 of the substrate side component 190 and the corresponding microlens of the fiber side component 180.

The first support portions 194 are protruded portions on the top surface of the substrate side component 190. The first support portions 194 can be provided on both sides in the longitudinal direction of the substrate side component 190. The first support portions 194 support the fiber side component 180. In the present embodiment, the microlens array 191 is provided between the first support portions 194.

The second support portions 195 are protruded portions on the bottom surface of the substrate side component 190. The second support portions 195 can be provided on both sides in the longitudinal direction of the substrate side component 190. The second support portions 195 can be mounted on the waveguide layer 161. Note that an area between the second support portions 195 is hereinafter called a central area 196. The height of the second support portions 195 is set to form the gap GP through which the adhesive 210 distributes due to capillary effect.

The bottom surface of the substrate side component 190, more specifically the central area 196, faces the area of the upper surface of the waveguide layer 161 in which the mirror cavities 167 are provided. In other words, the substrate side component 190 can cover the mirror cavities 167.

Note that the adhesive 210 also acts as an index-matching substance to reduce reflection loss at the gap GP. More specifically, the light coming from the mirror M to the microlens 193 passes the gap GP. Filling the gap GP with the adhesive 210 enables to reduce difference in refractive index between the adhesive 210 in the gap GP and the substrate side component 190 or the waveguide layer 161, compared with the gap GP filled with air. Filling the gap GP with the adhesive 210 also enables to eliminate an air boundary in the gap GP. Optionally, it can be possible to leave the gap GP in air.

In the following explanation, the direction along the axis of the waveguide core WG is called an axial direction. The direction perpendicular to the axial direction along the plane of the waveguide layer 161 is called a width direction. The direction vertically perpendicular to both of the axial direction and the width direction is called a height direction.

(Alignment Mechanism)

The multi-chip module (MCM) 5 is an assembly fabricated by high density optical integration. Such high density optical integration has been a key to high speed, lower cost interconnection for, among others, high performance (HPC) systems and high-end servers in data centers. Integration of optical components demands care for alignment of the components, thus creating technical challenges toward high-throughput or low cost production. For example, the high density optical integration can require an alignment accuracy of less than ±5 um in a few seconds of process time. For example, that misalignment between the substrate side component 190 and the waveguide layer 161 causes a signal loss of light passing the microlens 193 of the substrate side component 190. The waveguide layer 161 is an example of the claimed substrate or the claimed first body. The substrate side component 190 is an example of the claimed optical component or the claimed second body. The microlens 193 are an example of the claimed lenses or the claimed receive portion. The mirrors M are an example of the claimed output portion.

As shown in FIGS. 3A and 3B, the first embodiment uses an alignment mechanism that allows for self-alignment of the substrate side component 190, which can lead to high-throughput or low cost assembling of the MCM 5. More specifically, the substrate side component 190 can include predetermined shaped features, e.g., two engagement recesses 198, and the waveguide layer 161 can include predetermined shaped protruded features, e.g., two pegs 169. The two engagement recesses 198 and the two pegs 169 constitute the alignment mechanism. This alignment mechanism enables the substrate side component 190 to move toward the target position on the waveguide layer 161 even when the substrate side component 190 is firstly mounted on a misaligned position. In other words, the alignment mechanism allows for self-alignment of the substrate side component 190.

Figure 4A:
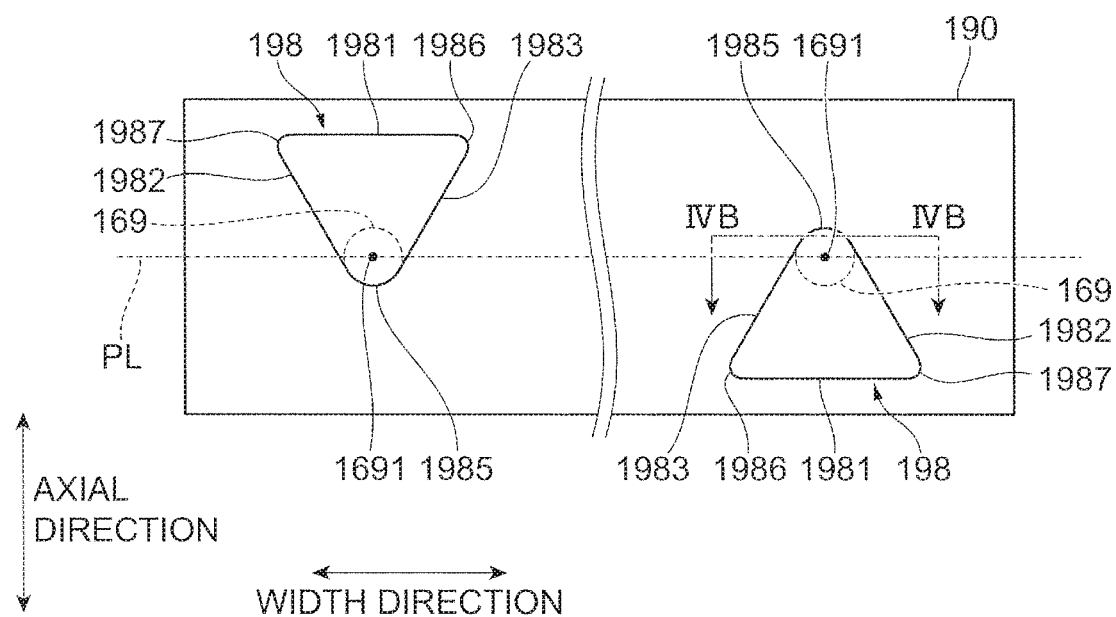
FIG. 4A is a bottom view of the substrate side component according to the first embodiment.
Figure 4B:
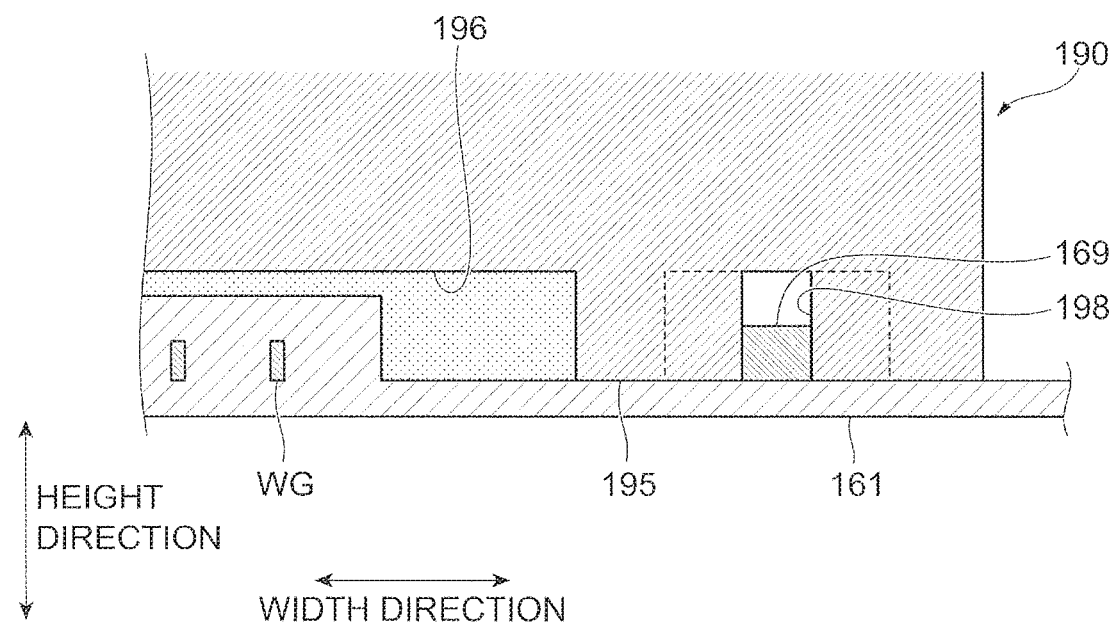
FIG. 4B is a schematic cross-sectional view taken along the line IVB-IVB in FIG. 4A.

FIG. 4A is a bottom view of the substrate side component 190 according to the first embodiment. FIG. 4B is a schematic cross-sectional view taken along the line IVB-IVB in FIG. 4A.

Referring to FIGS. 3A to 4B, the alignment mechanism, e.g., the engagement recesses 198 of the substrate side component 190 and the pegs 169 of the waveguide layer 161 will be explained in detail. The alignment mechanism is an example of the claimed positioning structure. The engagement recesses 198 are an example of the claimed recesses. The pegs 169 are an example of the claimed protrusions.

(Engagement Recess 198)

As shown in FIG. 3B, the engagement recesses 198 can be provided on the second support portions 195. The engagement recesses 198 can be on both sides in the longitudinal direction of the substrate side component 190. In other words, the engagement recesses 198 can be provided on both outsides of the microlens array 191.

As shown in FIG. 4A, the engagement recess 198 is larger than the peg 169 to receive the peg 169. This allows the peg 169 to move within the engagement recess 198.

The engagement recesses 198 can have the same shape. However, the orientations of the respective engagement recesses 198 are opposite to each other. For example, first apexes 1985 (described below) of the respective engagement recesses 198 are headed in the opposite directions in a plane along the axial direction.

In the first embodiment, the engagement recess 198 has a generally triangle shape. That is to say, the engagement recess 198 can be regarded as a triangular engagement hole. The engagement recess 198 has a first side 1981, a second side 1982, and a third side 1983. The second side 1982 and the third side 1983 form the first apex 1985. The first side 1981 and the third side 1983 form a second apex 1986. The first side 1981 and the second side 1982 form a third apex 1987. The first side 1981 is laid along the width direction. Further, the distance between the second side 1982 and the third side 1983 in the width direction changes in a direction parallel to the axial direction.

Each of the first apex 1985, the second apex 1986, and the third apex 1987 has a curved corner. The first apex 1985 has a larger radius of curvature than each of the second apex 1986 and the third apex 1987. The curvature of the first apex 1985 is shaped to match the outer surface of the peg 169, so that the peg 169 can be fit in the first apex 1985 (refer to FIG. 4B). The first apex 1985 is an example of a positioning surface. The second side 1982 is an example of a guide surface. The second side 1982 and the third side 1983 are an example of the two sides.

Here, the substrate side component 190 can be integrally formed by polymer injection molding. In this case, the engagement recesses 198 can be provided on the substrate side component 190 in the injection mold process.

(Peg 169)

As shown in FIG. 3B, the pegs 169 can be provided on both outsides of the array of the mirror cavities 167 in the width direction. The pegs 169 are provided at positions facing the respective engagement recesses 198 of the substrate side component 190 to be mounted on the waveguide layer 161.

The pegs 169 can have the same shape. In the first embodiment, the pegs 169 have a cylindrical shape. As shown in FIG. 4A, centers 1691 of the pegs 169 are aligned in the axial direction (refer to a line PL). This positions the pegs 169 in the same position in the axial direction. Note that the diameter of the peg 169 is smaller than the inner space of the engagement recess 198. The height of the peg 169 is smaller than the depth of the engagement recess 198.

Photolithography can be used to pattern the waveguide cores WG and to form the pegs 169 on top of the waveguide layer 161. Here, the waveguide cores WG and the pegs 169 can be formed using the same mask pattern. Use of photolithography allows to create the pegs 169 with a high degree of dimensional precision. This can improve the accuracy of positioning the substrate side component 190. Further, the use of photolithography allows to form the pegs 169 and the waveguide cores WG with the same material.

(Alignment Process)

Next, an explanation is given of an alignment process for aligning the waveguide layer 161 and the substrate side component 190 according to the first embodiment.

Figure 5A:
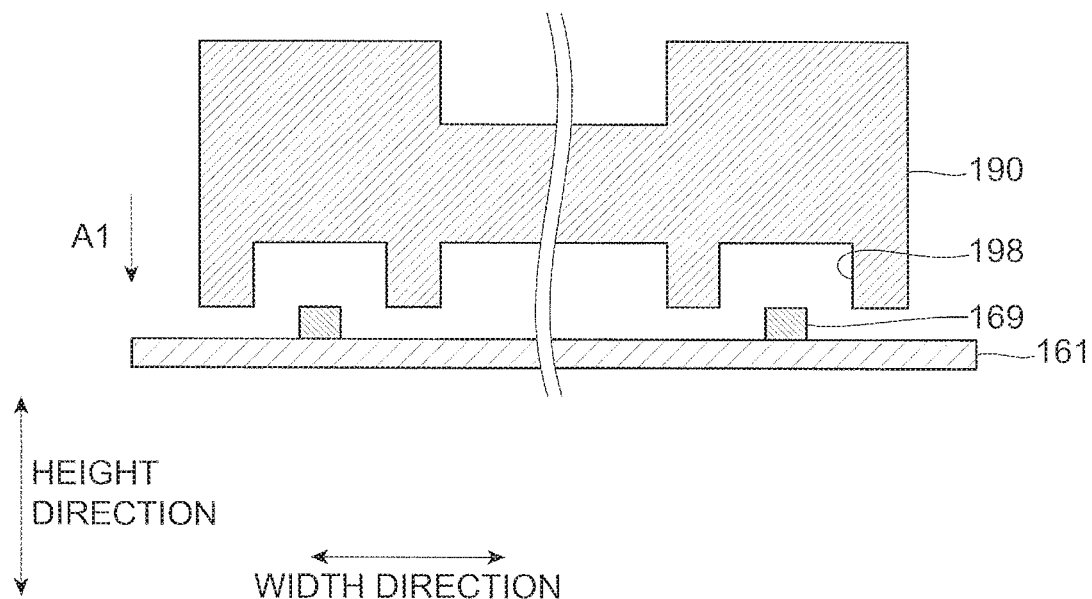
FIGS. 5A and 5B are a cross-sectional view and a top view, respectively, of the waveguide layer and the substrate side component in the first step of an alignment process according to the first embodiment.
Figure 5B:
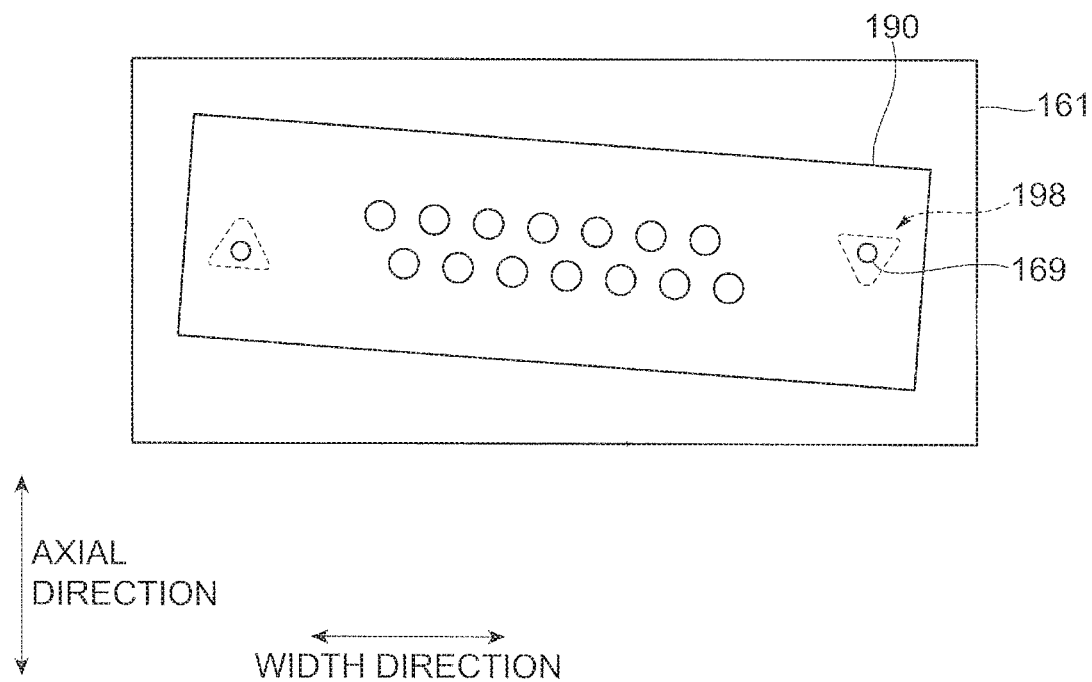

FIGS. 5A and 5B are a cross-sectional view and a top view, respectively, of the waveguide layer 161 and the substrate side component 190 in the first step of the alignment process according to the first embodiment. In an initial state, the engagement recesses 198 are provided on the substrate side component 190 in the injection mold process and the pegs 169 are provided on the waveguide layer 161 in the photolithography process. The alignment process can be conducted by a conventional mounting device, such as a robot arm (not shown).

In the first step, the robot arm grasps the substrate side component 190 to mount it on the waveguide layer 161 (refer to an arrow A1). In other words, the engagement recesses 198 of the substrate side component 190 moves in the height direction to approach the respective pegs 169 on the waveguide layer 161 to be placed over the respective pegs 169.

Figure 6A:
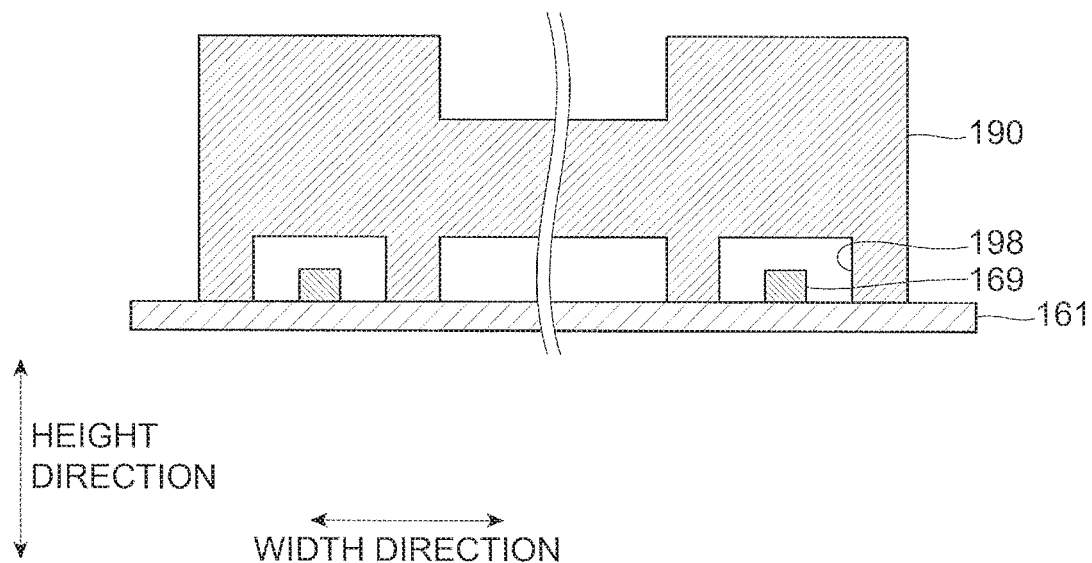
FIGS. 6A and 6B are a cross-sectional view and a top view, respectively, of the waveguide layer and the substrate side component in the second step of the alignment process according to the first embodiment.
Figure 6B:
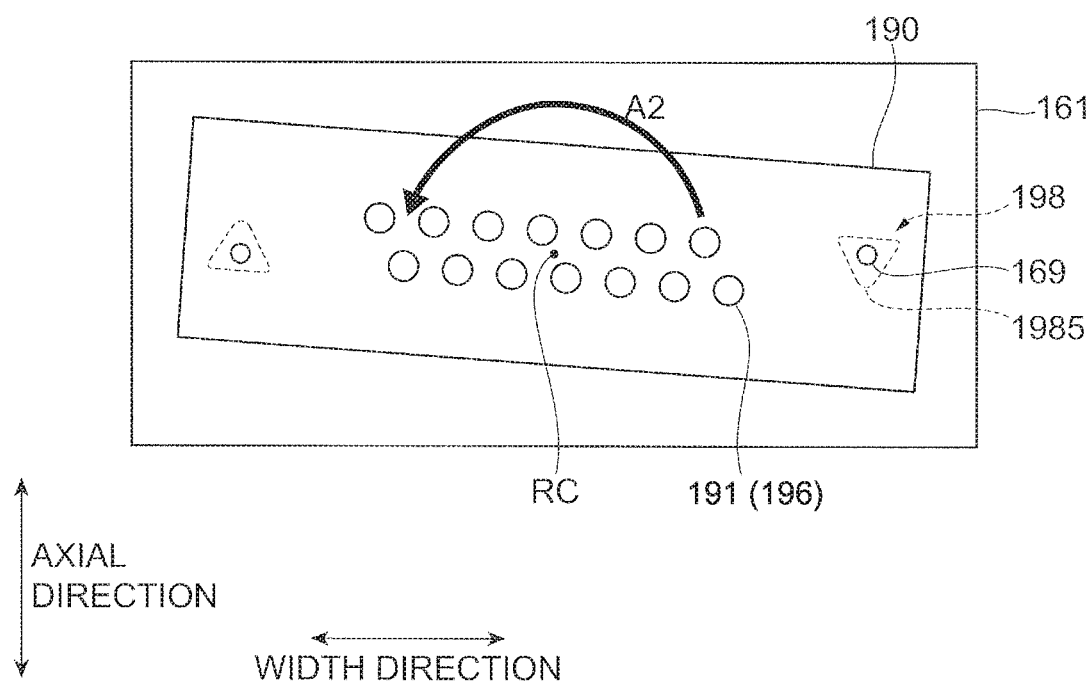

FIGS. 6A and 6B are a cross-sectional view and a top view, respectively, of the waveguide layer 161 and the substrate side component 190 in the second step of the alignment process according to the first embodiment. In the second step, the substrate side component 190 is moved on the waveguide layer 161 (refer to an arrow A2) by the robot arm. Specifically, the substrate side component 190 rotates around a rotation center RC, which is the center of the longitudinal direction of the substrate side component 190 and located in an area where the microlens array 191 is provided, e.g., the central area 196.

In the second step, the engagement recesses 198 placed over the respective pegs 169 move in one direction (counterclockwise in FIG. 6B; refer to the arrow A2). This direction is different from the direction in which the engagement recesses 198 approach the pegs 169 in the first step (refer to the arrow A1 in FIG. 5A). Rotation of the substrate side component 190 causes the peg 169 to slide along the second side 1982 and/or the third side 1983 (refer to FIG. 4A) of the corresponding engagement recess 198, which results in the peg 169 being locked in the first apex 1985. Since the two engagement recesses 169 are oppositely oriented in the axial direction, the two engagement recesses 198 are moved while being headed in opposite directions in the second step.

Figure 7A:
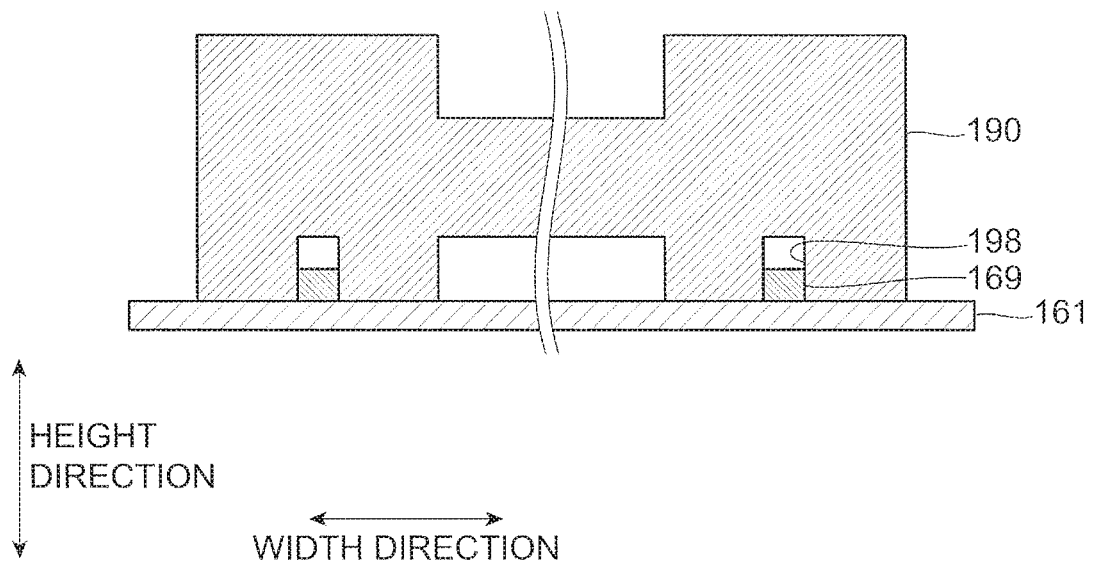
FIGS. 7A and 7B are a cross-sectional view and a top view, respectively, of the waveguide layer and the substrate side component in the third step of an alignment process according to the first embodiment.
Figure 7B:
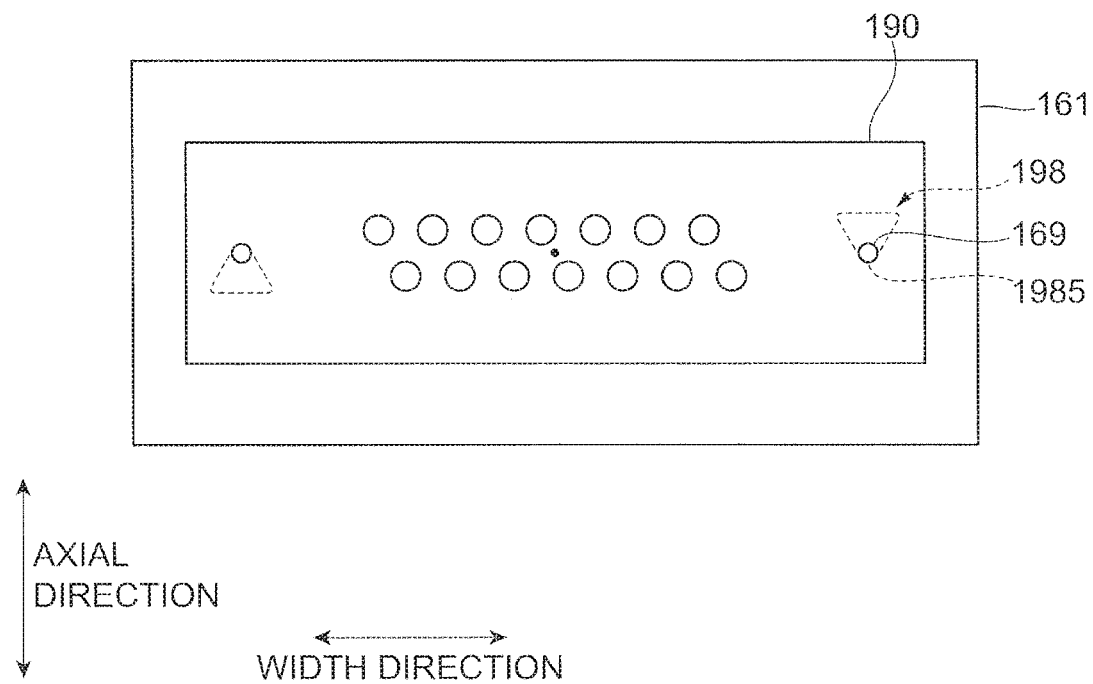

FIGS. 7A and 7 a cross-sectional view and a top view, respectively, of the waveguide layer 161 and the substrate side component 190 in the third step of the alignment process according to the first embodiment. In the third step, each peg 169 serving as a fiducial is fit into the first apex 1985 of the corresponding engagement recess 198. More specifically, the second side 1982 and the third side 1983 sandwiches the peg 169 to restrict movement of the substrate side component 190 in the width direction.

After the pegs 169 are fit into the first apexes 1985 of the respective engagement recesses 198, the adhesive 210 (refer to FIG. 2) in a fluidized state is applied around the substrate side component 190. The adhesive 210 can distribute between the inner surface of the engagement recesses 198 and the outer surface of the pegs 169 due to capillary effect. This enables to fix the pegs 169 in the engagement recesses 198.

Here, even if there is a deviation in the position of the peg 169 or the position of the engagement recess 198 in the axial direction due to a manufacturing error, the rotation of the substrate side component 190 can reduce the deviation. More specifically, the rotation of the substrate side component 190 enables the engagement recesses 198 to move in the opposite directions to cancel the deviation in the axial direction. This is unachievable if the substrate side component 190 is only laterally adjusted for its position. Further, the rotation of the substrate side component 190 can prevent falling of the substrate side component 190, which can occur in the case of the lateral adjustment of the substrate side component 190. The rotation of the substrate side component 190 can cause the substrate side component 190 to receive frictional forces that are exerted in opposite directions, which prevents the falling of the substrate side component 190.

In the shown example, the top surface of the peg 169 is spaced from the bottom of the engagement recess 198. However, the top surface of the peg 169 can contact the bottom of the engagement recess 198. That is to say, the peg 169 can support the substrate side component 190.

(Second Embodiment)

Figure 8A:
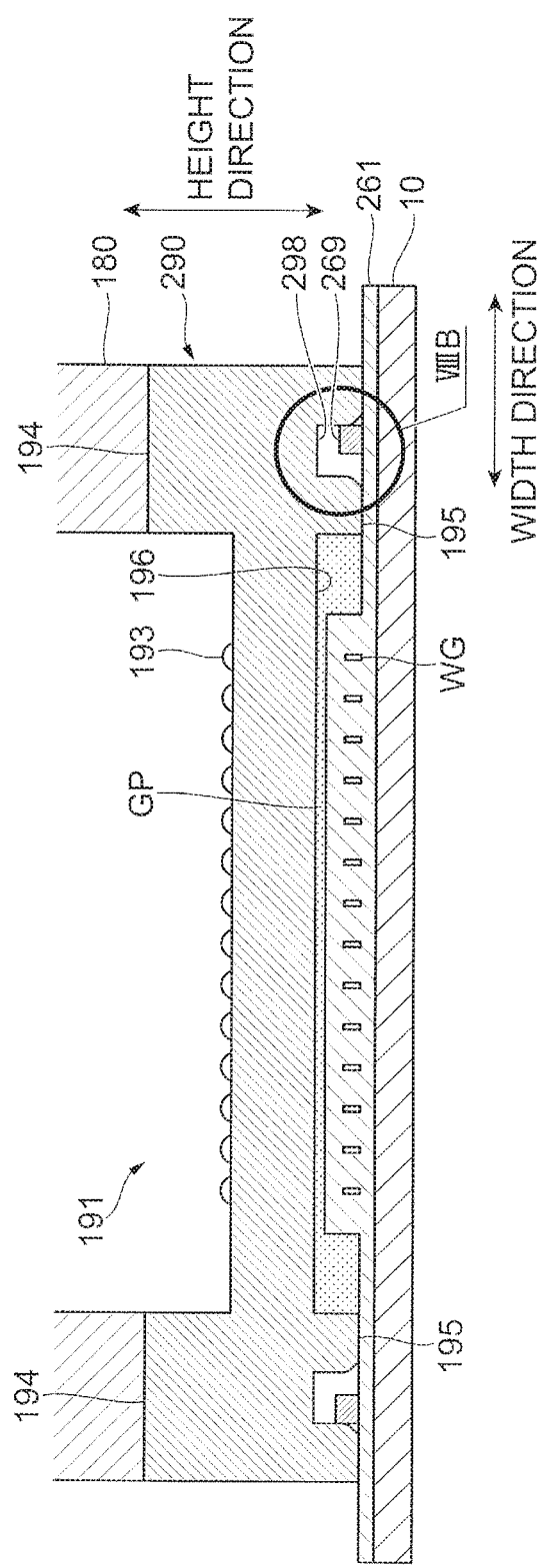
FIG. 8A is a schematic cross-sectional view of the substrate side component according to the second embodiment.
Figure 8C:
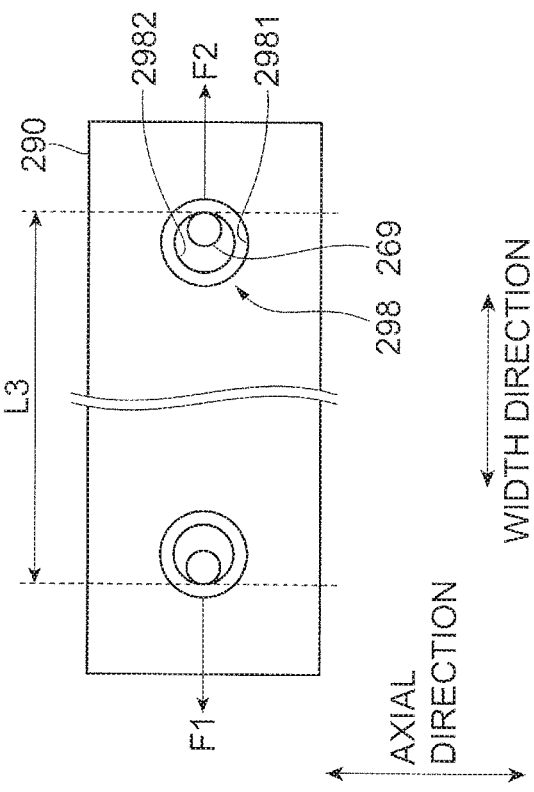
FIG. 8C is a schematic bottom view of the substrate side component according to the second embodiment.
Figure 8B:
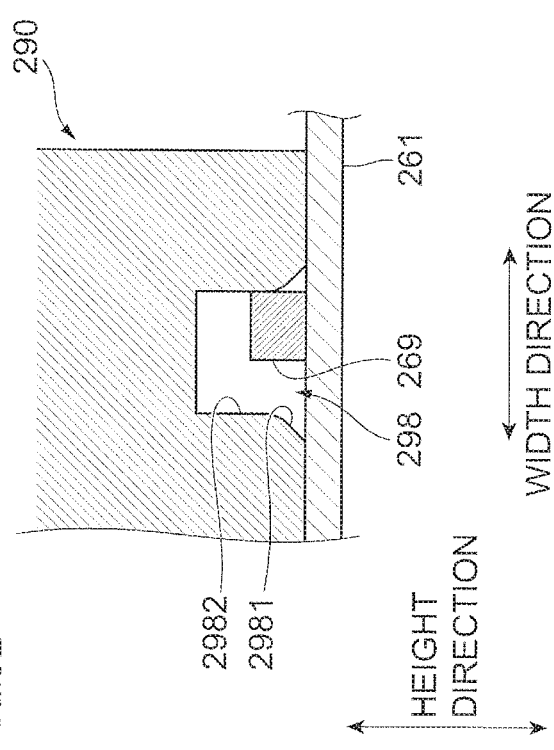
FIG. 8B is an enlarged view of an area VIIIB in FIG. 8A.

FIG. 8A is a schematic cross-sectional view of a substrate side component 290 according to the second embodiment. FIG. 8B is an enlarged view of an area VIIIB in FIG. 8A. FIG. 8C is a schematic bottom view of the substrate side component 290 according to the second embodiment. In FIGS. 8A to 8C, the same components as those of the first embodiment shown in FIGS. 3A to 4B are denoted by the same reference numerals, and the detailed explanation thereof will be omitted.

Referring to FIGS. 8A to 8C, an explanation is given of the substrate side component 290 according to the second embodiment. In the above first embodiment, the engagement recess 198 has a generally triangle shape. The shape of the engagement recess 198 is not limited to this as long as the engagement recess 198 can move over the peg 269 toward the target position on the waveguide layer 261.

As shown in FIGS. 8A to 8C, each engagement recess 298 can have a round shape. In the second embodiment, the engagement recess 298 has a taper portion 2981 around its opening and a bottom portion 2982 around its bottom. The taper portion 2981 increases its diameter in a direction from the bottom to the opening of the engagement recess 298.

The diameter of the engagement recess 298, e.g., the diameter of the taper portion 2981 and the diameter of the bottom portion 2982, is larger than the diameter of the peg 269. This allows the peg 269 to move within the engagement recess 298. In other words, this allows for X-Y rotational degree of freedom (DoF) and Z rotational DoF, so that the substrate side component 290 can rotate in a plane along the waveguide layer 261 and also can rotate in a plane perpendicular to the waveguide layer 261.

In the second embodiment, when situated in the bottom portions 2982, the pegs 269 outwardly push the respective inner walls of the bottom portions 2982 to define the position of the substrate side component 290 on the waveguide layer 261. Here, the mutually most distant parts of the inner walls of the two bottom portions 2982 are pushed by the respective pegs 269. And the bottom portions 2982 are pushed by the respective pegs 269 in the opposite directions (refer to arrows F1 and F2 in FIG. 8C).

In the shown example, a distance L1 (refer to FIG. 9B) between the centers of the pegs 269 is larger than a distance L2 (refer to FIG. 9B) between the centers of the engagement recesses 298. Further, the distance L3 (refer to in FIG. 8C) between the mutually most distant parts of the inner walls of the bottom portions 2982 is smaller than the distance between the mutually most distant parts of the outer surfaces of the pegs 269 so that the pegs 269 fit in the respective engagement recesses 298.

(Alignment Process)

Next, an explanation is given of an alignment process for aligning the waveguide layer 261 and the substrate side component 290 according to the second embodiment.

Figure 9A:
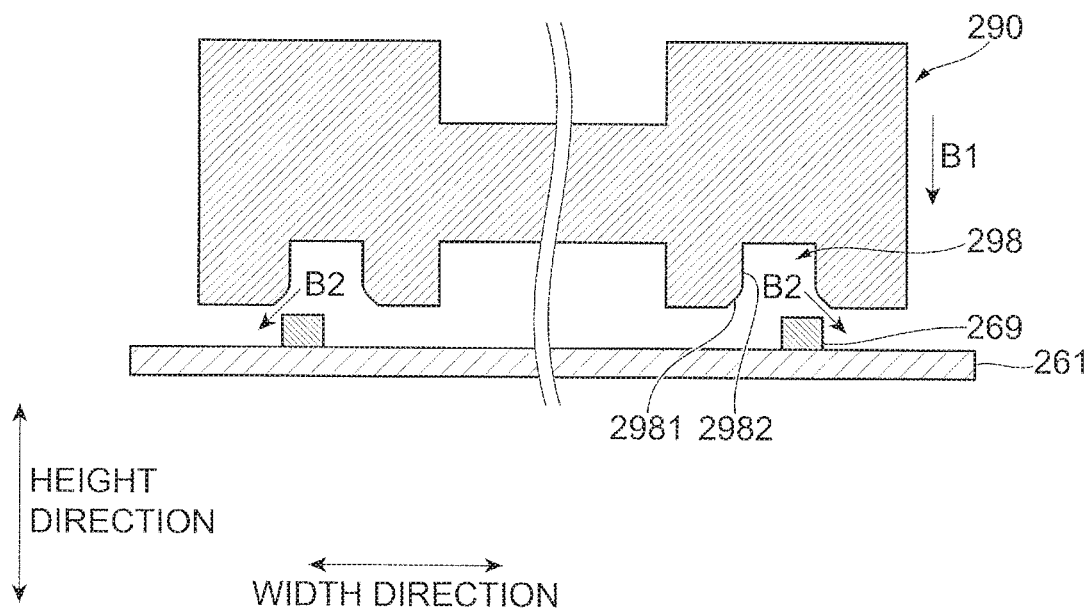
FIGS. 9A and 9B are a cross-sectional view and a top view, respectively, of the waveguide layer and the substrate side component in the first step of an alignment process according to the second embodiment.
Figure 9B:
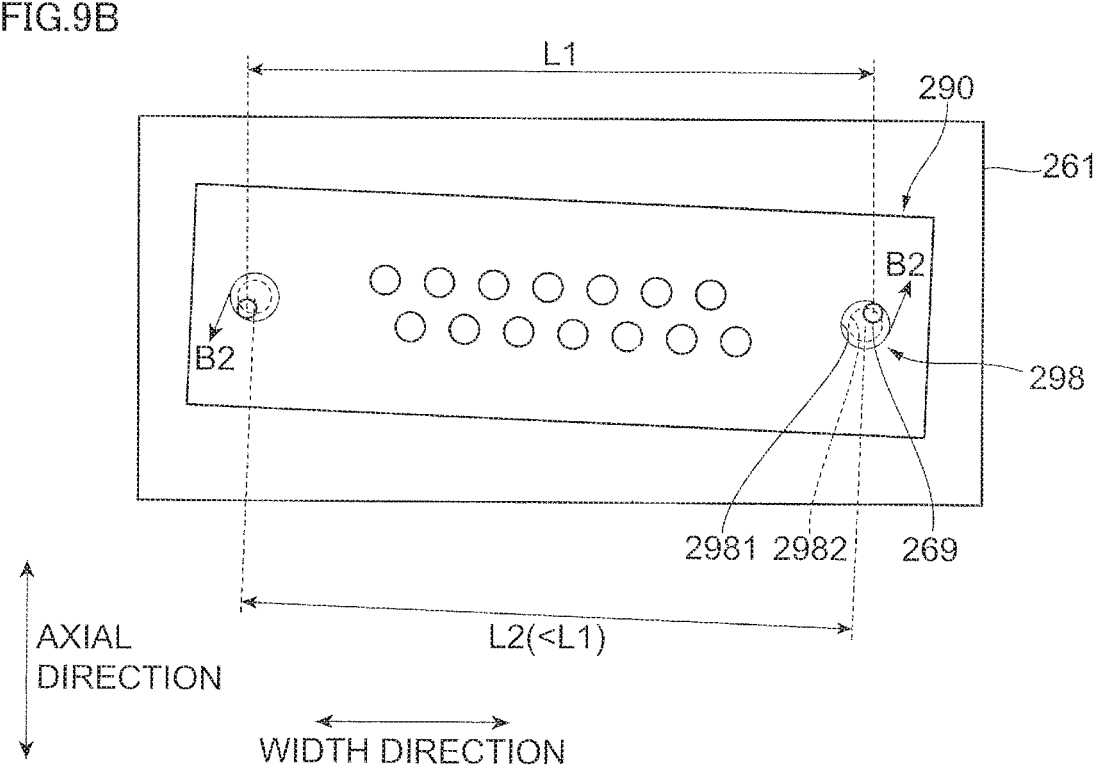

FIGS. 9A and 9B are a cross-sectional view and a top view, respectively, of the waveguide layer 261 and the substrate side component 290 in the first step of the alignment process according to the second embodiment. In an initial state, the engagement recesses 298 are provided on the substrate side component 290 in the injection mold process and the pegs 269 are provided on the waveguide layer 261 in the photolithography process. The alignment process can be conducted by a robot arm (not shown).

In the first step, the robot arm grasps the substrate side component 290 to mount it on the waveguide layer 261 (refer to an arrow B1). In other words, the engagement recesses 298 of the substrate side component 290 approach the respective pegs 269 on the waveguide layer 261. In the shown example, the respective pegs 269 push the corresponding taper portions 2981, so that the substrate side component 290 receives force to rotate (refer to an arrow B2).

Figure 10A:
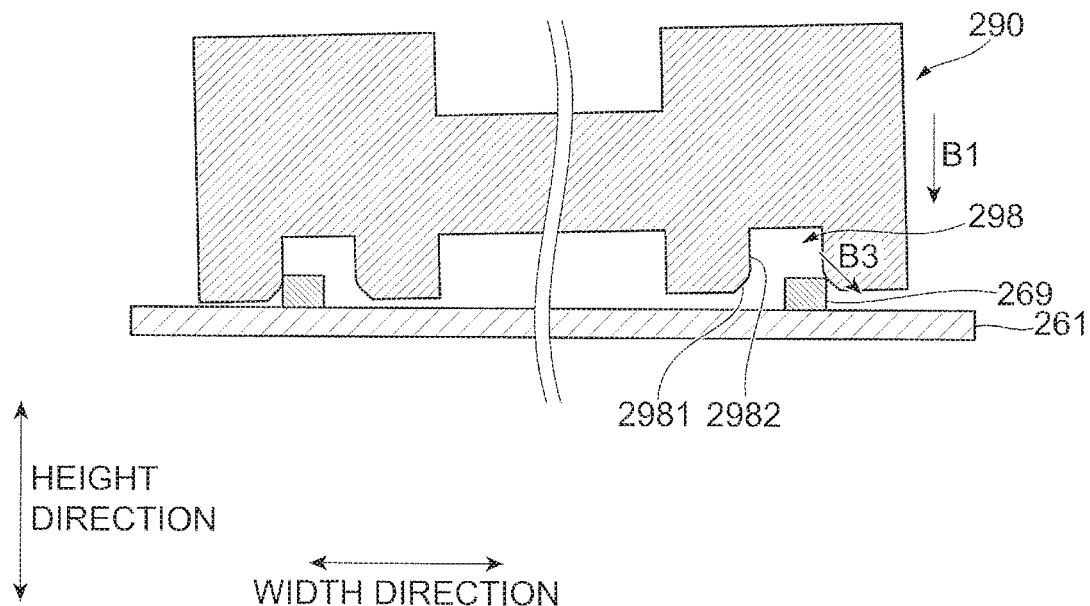
FIGS. 10A and 10B are a cross-sectional view and a top view, respectively, of the waveguide layer and the substrate side component in the second step of an alignment process according to the second embodiment.
Figure 10B:
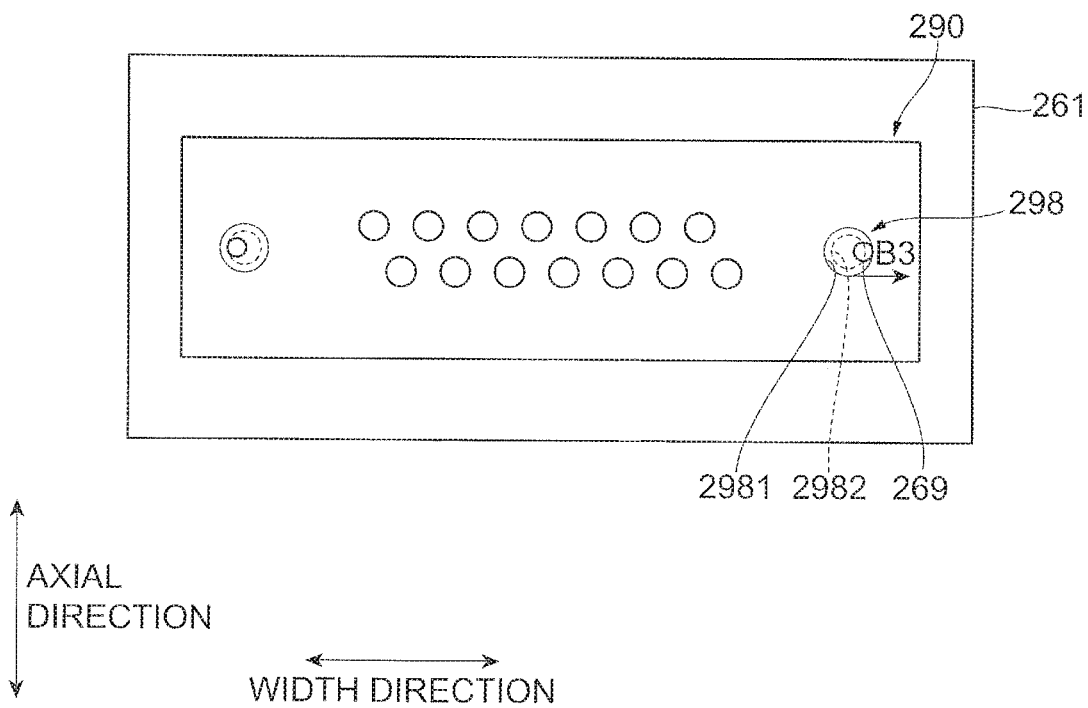

FIGS. 10A and 10B are a cross-sectional view and a top view, respectively, of the waveguide layer 261 and the substrate side component 290 in the second step of the alignment process according to the second embodiment. In the second step, while one peg 269 (left side in FIG. 10A) is situated in the bottom portion 2982 of the corresponding engagement recess 298, the other peg 269 (right side in FIG. 10A) is out of the other bottom portion 2982. The other peg 269 pushes the taper portion 2981 of the corresponding engagement recess 298, whereby the substrate side component 290 receives force to move toward the target position on the waveguide layer 261 (refer to an arrow B3).

Figure 11A:
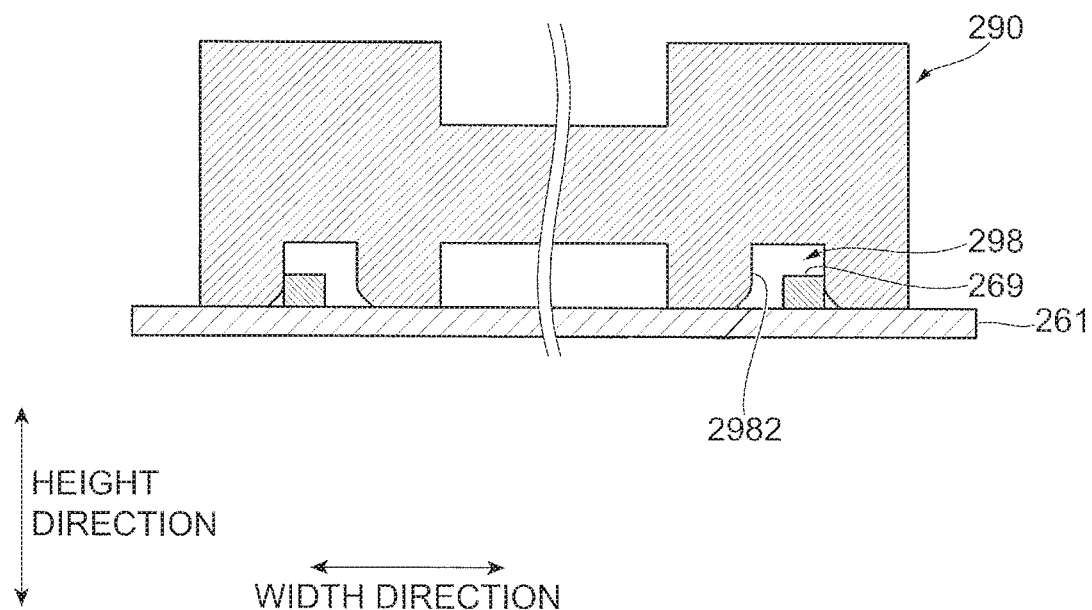
FIGS. 11A and 11B are a cross-sectional view and a top view, respectively, of the waveguide layer and the substrate side component in the third step of an alignment process according to the second embodiment.
Figure 11B:
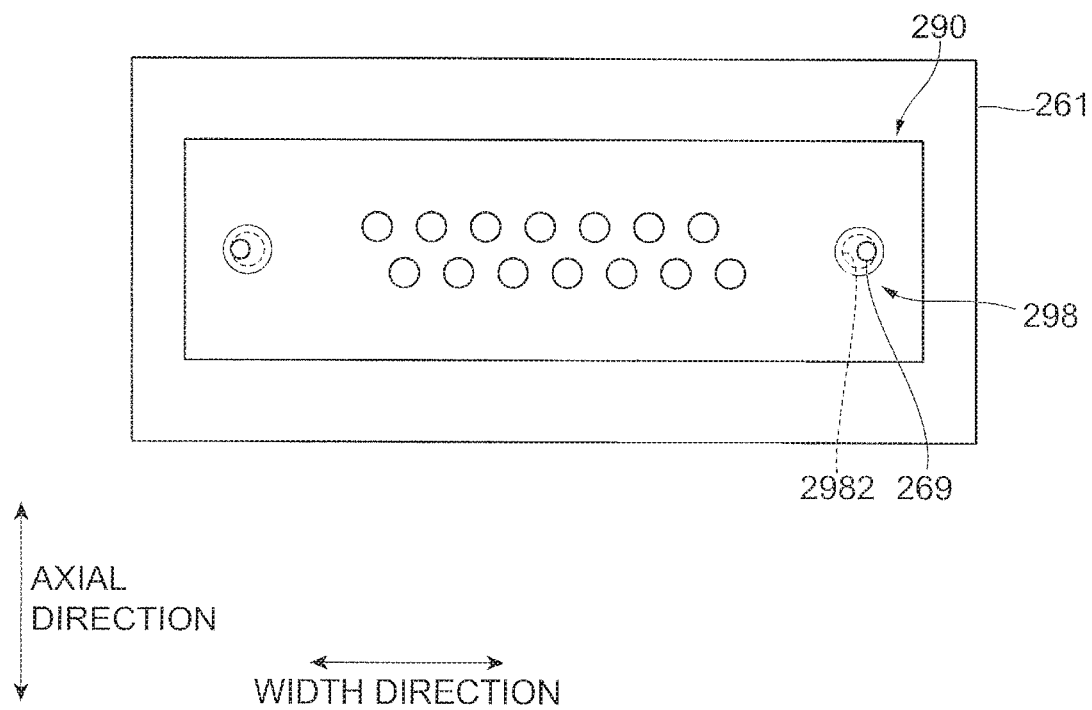

FIGS. 11A and 11B are a cross-sectional view and a top view, respectively, of the waveguide layer 261 and the substrate side component 290 in the third step of the alignment process according to the second embodiment. In the third step, the pegs 269 are fit into the respective bottom portions 2982 of the engagement recesses 298. More specifically, the inner walls of the respective bottom portions 2982 restrict movement of the substrate side component 290 in the axial direction and the width direction.

As mentioned above, the robot arm can grasp the component 290 to mount it on the waveguide layer 261 in the above steps. In these steps, gravity and a weak mechanical force is used to induce the self-alignment.

(Third Embodiment)

Figure 12A:
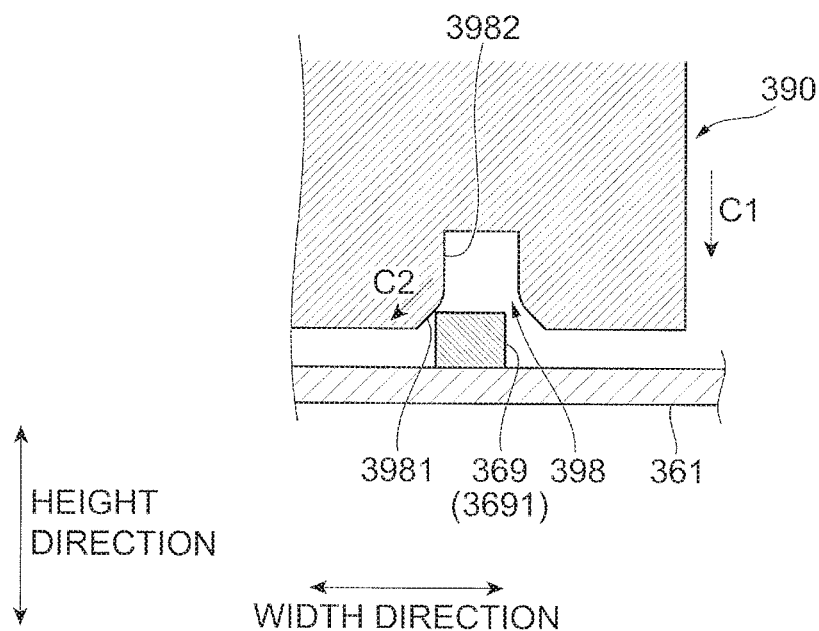
FIGS. 12A and 12B are a cross-sectional view and a top view, respectively, of the waveguide layer and the substrate side component in the first step of an alignment process according to the third embodiment.
Figure 12B:
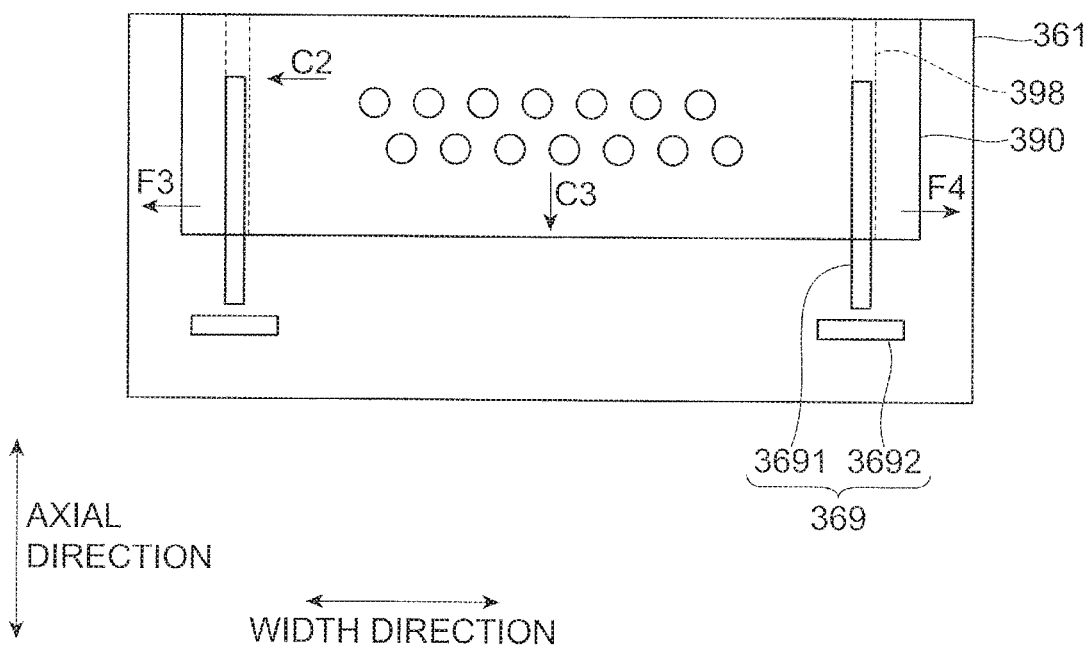
Figure 13A:
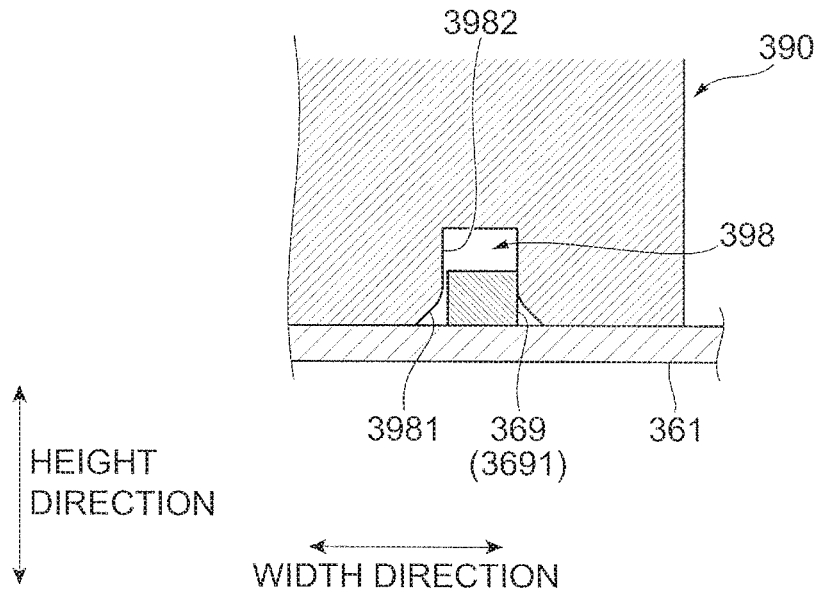
FIGS. 13A and 13B are a cross-sectional view and a top view, respectively, of the waveguide layer and the substrate side component in the second step of an alignment process according to the third embodiment.
Figure 13B:
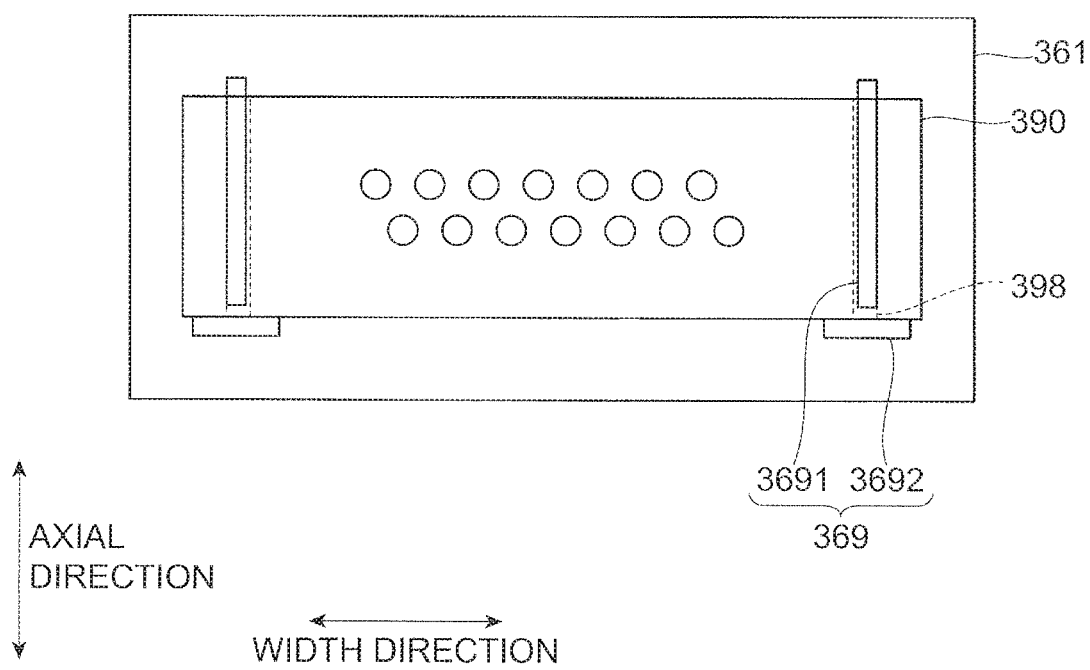

FIGS. 12A and 12B are a cross-sectional view and a top view, respectively, of a waveguide layer 361 and a substrate side component 390 in the first step of the alignment process according to the third embodiment. FIGS. 13A and 13B are a cross-sectional view and a top view, respectively, of the waveguide layer 361 and the substrate side component 390 in the second step of the alignment process according to the third embodiment.

As shown in FIGS. 12A and 12B, the substrate side component 390 can be provided with engagement recesses 398, and the waveguide layer 361 can be provided with pegs 369.

The engagement recess 398 can have a groove shape extending in a direction perpendicular to the longitudinal direction of the substrate side component 390. More specifically, the engagement recess 398 is provided in the entire length of the substrate side component 390 in the direction perpendicular to the longitudinal direction of the substrate side component 390. In the third embodiment, the engagement recess 398 has a taper portion 3981 around its opening and a bottom portion 3982 around its bottom. The taper portion 3981 increases its diameter in a direction from the bottom to the opening of the engagement recess 398.

The peg 369 provided on the waveguide layer 361 can have a T-rail shape. In the third exemplary embodiment, the peg 369 has a main rail 3691 and a stopper 3692. The main rail 3691 is laid in the axial direction. The stopper 3692 is provided at one end of the main rail 3691 and laid along the width direction.

Next, referring to FIGS. 12A to 13B, an explanation is given of an alignment process for aligning the waveguide layer 361 and the substrate side component 390 according to the third embodiment. In the shown example, the alignment process can be conducted by a robot arm.

In the first step, as shown in FIG. 12A, the robot arm grasps the substrate side component 390 to mount it on the waveguide layer 361 (refer to an arrow C1). In other words, the engagement recesses 398 of the substrate side component 390 approach the respective main rails 3691 of the pegs 369. In the shown example, the main rails 3691 pushes the respective taper portions 3981, so that the substrate side component 390 receives force by which the substrate side component 390 is displaced (refer to an arrow C2) to accommodate the pegs 369 in the respective bottom portions 3982. The bottom portions 3982 are pushed by the respective pegs 369 in the opposite directions (refer to arrows F3 and F4 in FIG. 12B). Further, as shown in FIG. 12B, the substrate side component 390 is moved toward the stopper 3692, for example, by the robot arm sliding the engagement recesses 398 on the respective main rails 3691 (refer to an arrow C3).

In the second step, as shown in FIGS. 13A and 13B, the main rail 3691 is accommodated in the corresponding bottom portion 3982. Further, the substrate side component 390 abuts against the stoppers 3692. In the third embodiment, the pegs 369 define the position of the substrate side component 390 on the waveguide layer 361. More specifically, the main rails 3691 align the positions, in the width direction, of the substrate side component 390 and the waveguide layer 361. The stoppers 3692 align the positions, in the axial direction, of the substrate side component 390 and the waveguide layer 361.

(Forth Embodiment)

Figure 14A:
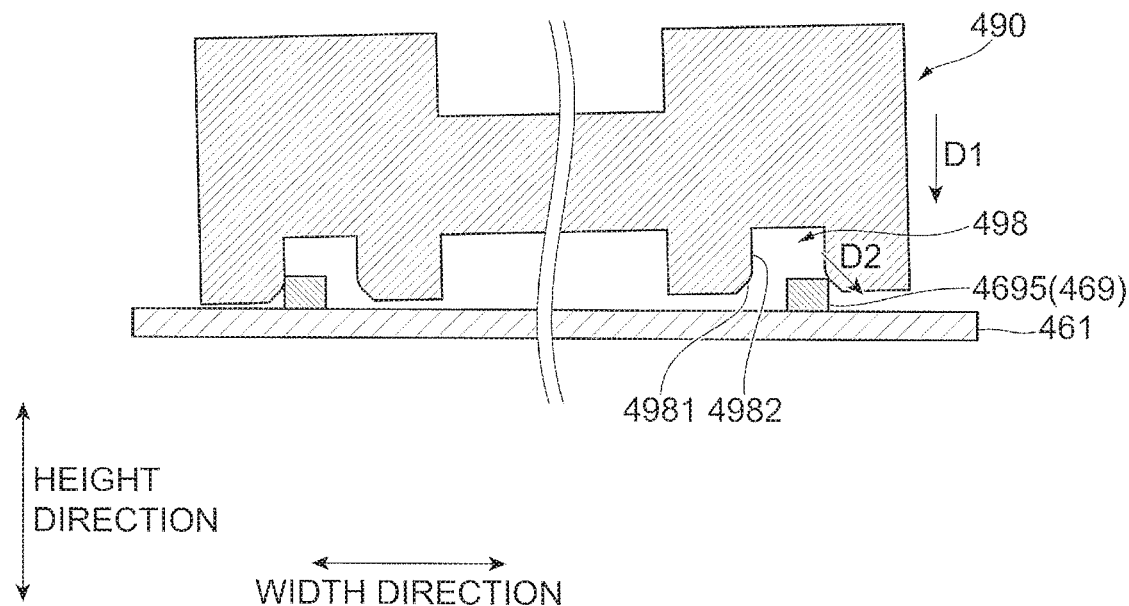
FIGS. 14A and 14B are a cross-sectional view and a top view, respectively, of the waveguide layer and the substrate side component in the first step of an alignment process according to the fourth embodiment.
Figure 14B:
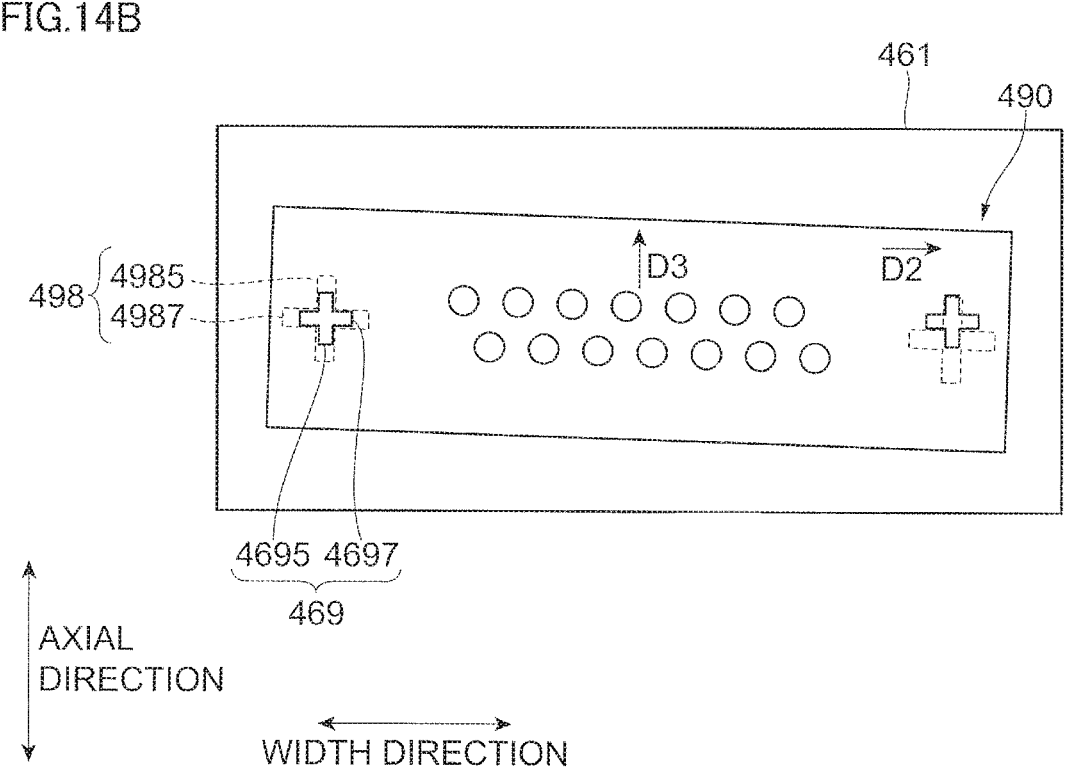
Figure 15A:
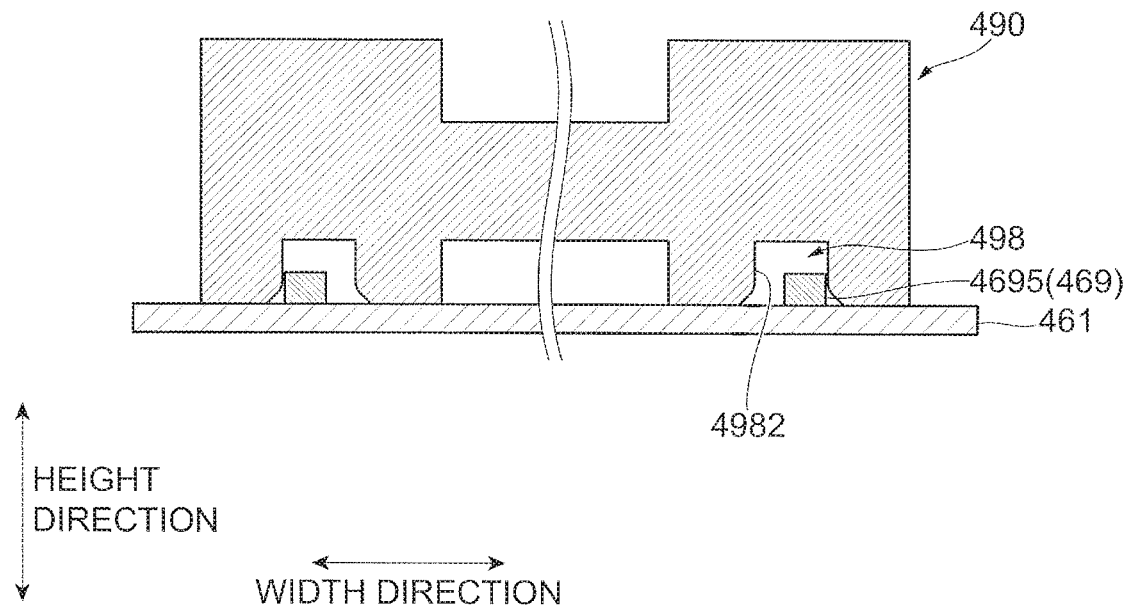
FIGS. 15A and 15B are a cross-sectional view and a top view, respectively, of the waveguide layer and the substrate side component in the second step of an alignment process according to the fourth embodiment.
Figure 15B:
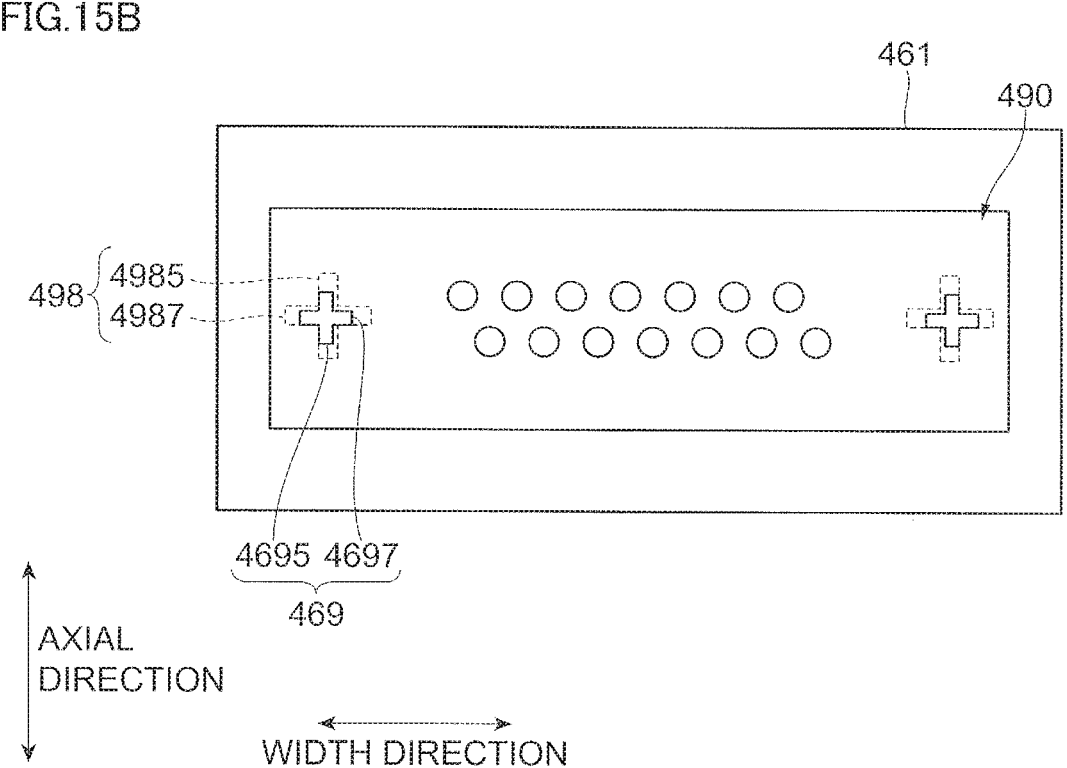

FIGS. 14A and 14B are a cross-sectional view and a top view, respectively, of a waveguide layer 461 and a substrate side component 490 in the first step of the alignment process according to the fourth embodiment. FIGS. 15A and 15B are a cross-sectional view and a top view, respectively, of the waveguide layer 461 and the substrate side component 490 in the second step of the alignment process.

As shown in FIGS. 14A and 14B, the substrate side component 490 can be provided with engagement recesses 498, and the waveguide layer 461 can be provided with pegs 469.

The engagement recess 498 can have a cross shape. More specifically, the engagement recess 498 has a first portion 4985 extending in a direction perpendicular to the longitudinal direction of the substrate side component 490, and a second portion 4987 extending in the longitudinal direction of the substrate side component 490. The first portion 4985 and the second portion 4987 intersect at their centers.

In the fourth embodiment, the engagement recess 498 has a taper portion 4981 around its opening and a bottom portion 4982 around its bottom. The taper portion 4981 increases its diameter in a direction from the bottom to the opening of the engagement recess 498.

The peg 469 provided on the waveguide layer 461 can have a cross shape. In the fourth exemplary embodiment, each peg 469 has a first portion 4695 extending in the axial direction, and a second portion 4697 extending in the width direction. The first portion 4695 and the second portion 4697 intersect at their centers.

Next, referring to FIGS. 14A to 15B, an explanation is given of an alignment process for aligning the waveguide layer 461 and the substrate side component 490 according to the fourth embodiment. In the shown example, the alignment process can be conducted by a robot arm.

In the first step, as shown in FIG. 14A, the robot arm grasps the substrate side component 490 to mount it on the waveguide layer 461 (refer to an arrow D1). In the shown example, the pegs 469 push the respective taper portions 4981, so that the substrate side component 490 receives force by which the substrate side component 490 is displaced (refer to an arrow D2) to accommodate the pegs 469 in the respective bottom portions 4982. In the shown example, a pair of the peg 469 and the engagement recess 498 on one side of the width direction (left side in FIG. 14B) helps pre-align the other pair on the other side (right side in FIG. 14B). Further, as shown in FIG. 14B, the substrate side component 490 is moved by the robot arm sliding the engagement recesses 498 on the respective pegs 469 (refer to an arrow D3).

In the second step, as shown in FIGS. 15A and 15B, the pegs 469 are accommodated in the respective bottom portions 4982. This is the result of the first portion 4985 of the engagement recess 498 being pushed by the first portion 4695 of the corresponding peg 469 and the second portion 4987 of the engagement recess 498 being pushed by the second portion 4697 of the corresponding peg 469. In the fourth embodiment, the pegs 469 define the position of the substrate side component 490 on the waveguide layer 461. More specifically, the first portions 4695 of the pegs 469 align the positions, in the width direction, of the substrate side component 490 and the waveguide layer 461. The second portions 4697 of the pegs 469 align the positions, in the axial direction, of the substrate side component 490 and the waveguide layer 461.

Here, the second portions 4697 of the pegs 469 can correspond to the stoppers 3692 shown in FIG. 12B, which define the position of the substrate side component 390 in the axial direction. In other words, the pegs 469 can eliminate the stoppers 3692 of the third embodiment.

(Modifications)

In the above first embodiment, the engagement recesses 198 are provided on the substrate side component 190 and the pegs 169 are provided on the waveguide layer 161. The alignment mechanism is not limited to this structure, as long as the substrate side component 190 and the pegs 169 can be hooked to each other. For example, the engagement recesses 198 can be provided on the waveguide layer 161, and the pegs 169 can be provided on the substrate side component 190.

In another example, the substrate side component 190 can be provided with the engagement recess 198 and the peg 169, and the waveguide layer 161 can also be provided with the peg 169 and the engagement recess 198 that are positioned respectively corresponding to the engagement recess 198 and the peg 169 of the substrate side component 190.

In still another example, three or more sets of the engagement recess 198 and the peg 169 can be provided on the substrate side component 190 and the waveguide layer 161. In still another example, the engagement recess 198 and/or the peg 169 can be provided on the both sides in the longitudinal direction of the substrate side component 190.

In the above first embodiment, the orientations of the engagement recesses 198 are opposite to each other (refer to FIG. 4A). The orientations of the engagement recesses 198 are not limited to this. For example, the engagement recesses 198 can be oriented in the same direction.

In the second embodiment, the pegs 169 outwardly push the respective inner walls of the bottom portions 2982 to define the position of the substrate side component 290 on the waveguide layer 161. The pegs 169 can inwardly push the respective inner walls of the bottom portions 2982 to define the position of the substrate side component 290 on the waveguide layer 161.

The above alignment mechanism can be provided on any components besides the combination of the substrate side component 190 and the waveguide layer 161. For example, the above alignment mechanism can be provided on the fiber side component 180 and the substrate side component 190. More specifically, the engagement recesses 198 can be provided on the fiber side component 180 and the pegs 169 can be provided on the substrate side component 190.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical device comprising:
    a substrate including a plurality of waveguide cores, the plurality of waveguide cores allowing light to pass through the plurality of waveguide cores; and
    an optical component provided on the substrate, the optical component including a plurality of lenses, each of the plurality of lenses transmitting light passing through one of the corresponding plurality of waveguide cores on the substrate, wherein
    the substrate and the optical component are each provided with a positioning structure to position the plurality of lenses relative to the substrate,
    the positioning structure includes a plurality of protrusions provided on at least one of the substrate and the optical component, and a plurality of recesses provided on at least the other of the substrate and the optical component, each of the plurality of recesses accommodating a corresponding one of the plurality of protrusions, and
    the position of the optical component relative to the substrate is configured to be changed by rotating the optical component on the substrate, such that an outer surface of each of the plurality of protrusions contacts a positioning surface of a corresponding one of the plurality of recesses, the positioning surface being a part of an inner surface of each of the plurality of recesses having accommodated the corresponding one of the plurality of protrusions to position the plurality of lenses relative to the substrate.

2. The optical device of claim 1, wherein each of the plurality of protrusions pushes a corresponding one of the positioning surfaces in a different direction.

3. The optical device of claim 1, wherein one of the plurality of recesses is provided at a position facing another one of the plurality of recesses across the plurality of lenses of the optical component mounted on the substrate, and each one of the plurality of protrusions is provided at a position facing a corresponding one of the plurality of recesses.

4. The optical device of claim 1, wherein the plurality of protrusions are provided on the substrate, and a material of the plurality of protrusions is the same as a material of the plurality waveguide cores.

5. The optical device of claim 1, wherein each of the plurality of recesses includes at least a guide surface guiding a corresponding one of the plurality of protrusions inserted in each of the plurality of recesses, and
    the guide surface guides the corresponding one of the plurality of protrusions in a different direction from a direction in which the corresponding one of the plurality of protrusions is inserted into each of the plurality of recesses.

6. The optical device of claim 5, wherein the different direction is perpendicular to the direction in which the corresponding one of the plurality of protrusions is inserted into each of the plurality of recesses.

7. The optical device of claim 1, wherein each of the plurality of recesses includes an opening having a substantially triangle shape, and two sides of the substantially triangle shape sandwiches the corresponding one of the plurality of protrusions to position the plurality of lenses relative to the substrate.

8. The optical device of claim 1, wherein the plurality of recesses include openings having a predetermined shape, the openings of the plurality of recesses are headed in opposite directions.

9. An optical device comprising:
    a first body including an output portion outputting light; and
    a second body including a receive portion receiving light from the output portion, wherein
    the first body and the second body are each provided with a positioning structure by which a relative position of the output portion and the receive portion is defined,
    the positioning structure includes a plurality of protrusions provided on at least one of the first body and the second body, and a plurality of recesses provided on at least the other one of the first body and the second body, each of the plurality of recesses accommodating a corresponding one of the plurality of protrusions,
    a position of the first body relative to the second body is changed in a state where each of the plurality of recesses accommodates the corresponding one of the plurality of protrusions such that each of the plurality of protrusions pushes a positioning surface of a corresponding one of the plurality of recesses in opposite directions, changing of the position of the first body relative to the second body is conducted by rotating the second body relative to the first body, and
    the relative position of the output portion and the receive portion is defined at a position where each of the plurality of recesses restricts movement of the corresponding one of the plurality of protrusions.

10. A method for fabricating an optical device, the method comprising:
    forming a substrate and an optical component, the substrate including a plurality waveguide cores, the plurality of waveguide cores allowing light to pass through the plurality waveguide cores, the optical component being provided on the substrate, the optical component including a plurality of lenses, each of the plurality of lenses transmitting light passing through one of the corresponding plurality of waveguide cores on the substrate, the substrate and the optical component being each provided with a positioning structure to position the plurality of lenses relative to the substrate, the positioning structure including a plurality of protrusions provided on at least one of the substrate and the optical component, and a plurality of recesses provided on at least the other one of the substrate and the optical component;
    inserting the plurality of protrusions in corresponding one of the plurality of recesses; and
    changing a position of the optical component relative to the substrate until an outer surface of each of the plurality of protrusions contacts a positioning surface of a corresponding one of the plurality of recesses, each of the plurality of protrusions pushing the positioning surface of a corresponding one of the plurality of recesses in opposite directions, the positioning surface being a part of an inner surface of each of the plurality of recesses having accommodated the corresponding one of the plurality of protrusions to position the plurality of lenses relative to the substrate, wherein the changing of the position of the optical component relative to the substrate is conducted by rotating the optical component on the substrate.

* * * * *

UNITED STATES PATENT AND TRADEMARK OFFICE
CERTIFICATE OF CORRECTION

PATENT NO. : 10,754,070 B2  
APPLICATION NO. : 16/210630  
DATED : August 25, 2020  
INVENTOR(S) : Koji Masuda et al.

Page 1 of 1

It is certified that error appears in the above-identified patent and that said Letters Patent is hereby corrected as shown below:

On the Title Page

Item [72], DELETE "Alexander Janta-Polczynski" and INSERT --Barnim Alexander Janta-Polczynski--

Signed and Sealed this
Twenty-second Day of December, 2020

Andrei Iancu
*Director of the United States Patent and Trademark Office*